US008888493B2

(12) United States Patent
Sheehan et al.

(10) Patent No.: US 8,888,493 B2
(45) Date of Patent: *Nov. 18, 2014

(54) READING LEVEL ASSESSMENT METHOD, SYSTEM, AND COMPUTER PROGRAM PRODUCT FOR HIGH-STAKES TESTING APPLICATIONS

(71) Applicant: Educational Testing Service, Princeton, NJ (US)

(72) Inventors: Kathleen Marie Sheehan, Skillman, NJ (US); Irene Kostin, Princeton, NJ (US); Yoko Futagi, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,681

(22) Filed: Jul. 24, 2013

(65) Prior Publication Data
US 2013/0309639 A1    Nov. 21, 2013

Related U.S. Application Data

(63) Continuation of application No. 12/363,243, filed on Jan. 30, 2009, now Pat. No. 8,517,738.

(60) Provisional application No. 61/025,146, filed on Jan. 31, 2008.

(51) Int. Cl.
*G09B 5/00* (2006.01)
*G09B 17/00* (2006.01)

(52) U.S. Cl.
CPC .............. *G09B 17/003* (2013.01); *G09B 17/00* (2013.01)
USPC ........................................................ 434/169

(58) Field of Classification Search
USPC .......................................... 434/169, 112, 116
See application file for complete search history.

(56) References Cited

U.S. PATENT DOCUMENTS 5,873,109 A * 2/1999 High .............................. 715/243
6,973,363 B2 * 12/2005 Masumoto et al. ........... 700/109

(Continued)

OTHER PUBLICATIONS

McNamara, D., Louwerse, M. and Graesser, A., Coh-Metrix:Automated Cohesion and Coherance Scores to Predict text Readability and Facilitate Comprehension, Uiversity of Memphis, Office of Educational Research, Sep. 2002-Aug. 2005, [Retrieved on Sep. 16, 2011], Retrieved from internet <URLhttp://csep.psyc.memphis.edu/mcnamara/pdf/IESproposal.pdf>.*

(Continued)

*Primary Examiner* — Robert J Utama
*Assistant Examiner* — Sadaruz Zaman
(74) *Attorney, Agent, or Firm* — Jones Day

(57) ABSTRACT

A computer-implemented method, system, and computer program product for automatically assessing text difficulty. Text reading difficulty predictions are expressed on a scale that is aligned with published reading standards. Two distinct difficulty models are provided for informational and literary texts. A principal components analysis implemented on a large collection of texts is used to develop independent variables accounting for strong intercorrelations exhibited by many important linguistic features. Multiple dimensions of text variation are addressed, including new dimensions beyond syntactic complexity and semantic difficulty. Feedback about text difficulty is provided in a hierarchically structured format designed to support successful text adaptation efforts. The invention ensures that resulting text difficulty estimates are unbiased with respect to genre, are highly correlated with estimates provided by human experts, and are based on a more realistic model of the aspects of text variation that contribute to observed difficulty variation.

31 Claims, 20 Drawing Sheets

(56) References Cited

U.S. PATENT DOCUMENTS

| | | | | |
|---|---|---|---|---|
| 7,136,877 | B2* | 11/2006 | Volcani et al. | 704/10 |
| 7,174,295 | B1* | 2/2007 | Kivimaki | 704/260 |
| 7,464,023 | B2* | 12/2008 | Parry et al. | 704/9 |
| 2002/0091713 | A1* | 7/2002 | Walker | 707/200 |
| 2005/0026131 | A1* | 2/2005 | Elzinga et al. | 434/365 |

OTHER PUBLICATIONS

Graesser, A., McNamara, D., Louwerse, M. and Cai, Z., "Coh-Metrix: Analysis of text on cohesion and language", 2004, Behavior Research Methods, Instruments & Computer, 36(2), p. 193-202, [Retrieved on Sep. 16, 2011], Retrieved from the internet <URL:http://www.springerlink.com/content/y272l62717134334/fulltext.pdf >.*

Rog, L. and Burton,W., "Matching text and readers:leveling early reading materials for assessment and instruction",Dec. 2001/Jan. 2002, International Reading Association, vol. 55,No. 4, p. 348-356, [Retrieved on Sep. 16, 2011], Retrieved from internet <http://kto2literacy.wikispaces.com/file/view/matching+texts+and+readers+rog+burton+2001.pdf>.*

Sawyer, Mary; A Review of Research in Revising Instructional Text; Journal of Reading Behavior, 23(3); pp. 307-333; 1991.

Shanahan, Timothy, Kamil, Michael, Tobin, Aileen; Cloze as a Measure of Intersentential Comprehension; Reading Research Quarterly, 17(2); pp. 229-255; 1982.

Sheehan, Kathleen, Kostin, Irene, Persky, Hilary; Predicting Item Difficulty as a Function of Inferential Processing Requirements: An Examination of the Reading Skills Underlying Performance on the NAEP Grade 8 Reading Assessment; Annual Meeting of the National Council on Measurement in Education; San Francisco, CA; 2006.

Sheehan, Kathleen, Kostin, Irene, Futagi, Yoko, Sabatini, John; Measuring the Prevalence of Spoken Language Structures in Printed Text: An Approach for Improving Automated Predictions of Text Difficulty; Annual Meeting of the Society for Text and Discourse; Minneapolis, MN; 2006.

Sheehan, Kathleen, Kostin, Irene, Futagi, Yoko, Hemat, Ramin, Zuckerman, Daniel; Inside SourceFinder: Predicting the Acceptability Status of Candidate Reading Comprehension Source Documents; Report RR-06-24; Princeton, NJ: ETS; 2006.

Sheehan, Kathleen, Kostin, Irene, Futagi, Yoko; Reading Level Assessment for Literary and Expository Text; Proceedings of the 29th Annual Meeting of the Cognitive Science Society; Nashville, TN; 2007.

Sheehan, Kathleen, Kostin, Irene, Futagi, Yoko; Supporting Efficient Evidence-Centered Item Development for the GRE Verbal Measure; Report RR-07-29; Princeton, NJ: ETS; 2007.

Sheehan, Kathleen, Kostin, Irene, Futagi, Yoko; SourceFinder: A Construct-Driven Approach for Locating Appropriately Targeted Reading Comprehension Source Texts; Proceedings of the 2007 Workshop of the International Speech Communication Association, Special Interest Group on Speech and Language Technology in Education; Farmington, PA; 2007.

Snedecor, George, Cochran, William; Statistical Methods; Iowa State University Press, IA; 1973.

Stenner, Jackson, Horabin, Ivan, Smith, Dean, Smith, Malbert; Most Comprehension Tests Do Measure Reading Comprehension: A Response to McLean and Goldstein; Phi Delta Kappan; pp. 765-767; 1988.

Stenner, Jackson; Measuring Reading Comprehension with the Lexile Framework; California Comparability Symposium; 1996.

Tabachnick, Barbara, Fidell, Linda; Using Multivariate Statistics, Fourth Edition; Boston: Allyn and Bacon; 2001.

Van Den Broek, Paul, Virtue, Sandra, Everson, Michelle, Tzeng, Yuhtsuen, Sung, Yung-chi; Comprehension and Memory of Science Texts: Inferential Processes and the Construction of a Mental Representation; Ch. 6 In J. Otero, J. Leon, and A. Graesser (Eds.), The Psychology of Science Text Comprehension; Mahwah, NJ: Erlbaum; pp. 131-154; 2002.

Zabrucky, Karen, Moore, DeWayne; Influence of Text Genre on Adults' Monitoring of Understanding and Recall; Educational Gerontology, 25; pp. 691-710; 1999.

Zechner, Klaus; Automatic Summarization of Spoken Dialogues in Unrestricted Domains; Doctoral Thesis, Carnegie Mellon University, School of Computer Science, Language Technology Institute; 2001.

Zeno, Susan, Ivens, Stephen, Millard, Robert, Duvvuri, Raj; The Educator's Word Frequency Guide; Brewster, NY: Touchstone Applied Science Associates; 1995.

International Search Report of PCT/2009/032674; Mar. 16, 2009.

Written Opinion of the International Search Report of PCT/2009/032674; Mar. 16, 2009.

Beck, Isabel, McKeown, Margaret, Worthy, Jo; Giving a Text Voice Can Improve Students' Understanding; Reading Research Quarterly, 30(2); pp. 220-238; 1995.

Best, Rachel, Floyd, Randy, McNamara, Michelle; Understanding the Fourth-Grade Slump: Comprehension Difficulties as a Function of Reader Aptitudes and Text Genre; Meeting of the American Educational Research Association; San Diego, CA; 2004.

Biber, Douglas; Spoken and Written Textual Dimension in English: Resolving the Contradictory Findings; Language, 62(2); pp. 384-414; 1986.

Biber, Douglas; Variation Across Speech and Writing; Cambridge: Cambridge University Press; 1988.

Biber, Douglas, Conrad, Susan, Reppen, Randi, Byrd, Pat, Helt, Marie, Clark, Victoria, Cortes, Viviana, Csomay, Eniko, Urzua, Alfredo; Representing Language Use in the University: Analysis of the TOEFL 2000 Spoken and Written Academic Language Corpus; TOEFL Monograph Series, MS025; Princeton, NJ; 2004.

Biber, Douglas, Johansson, Stig, Leech, Geoffrey, Conrad, Susan, Finegan, Edward; Longman Grammar of Spoken and Written English; Essex, England: Pearson Education Ltd.; 1999.

Britton, Bruce, Gulgoz, Sami; Using Kintsch's Computational Model to Improve Instructional Text: Effects of Repairing Inference Calls on Recall and Cognitive Structures; Journal of Educational Psychology, 83(3); pp. 329-345; 1991.

Carpenter, Patricia, Just, Marcel Adam; Sentence Comprehension: A Psycholinguistic Processing Model of Verification; Psychological Review, 82(1); pp. 45-73; 1975.

Chall, Jeanne, Dale, Edgar; Readability Revisited: The New Dale-Chall Readability Formula; Cambridge: Brookline Books; 1995.

Cleveland, William; Robust Locally Weighted Regression and Smoothing Scatterplots; Journal of the American Statistical Association, 74(368); pp. 829-836; 1979.

Cohen, Jacob, Cohen, Patricia, West, Stephen, Aiken, Leona; Applied Multiple Regression/Correlation Analysis for the Behavioral Sciences; New Jersey: Erlbaum; 2003.

Coleman, Merl, Liau, T.L.; A Computer Readability Formula Designed for Machine Scoring; Journal of Applied Psychology, 60(2); pp. 283-284; 1975.

Coltheart, Max; The MRC Psycholinguistic Database; Quarterly Journal of Experimental Psychology, 33A; pp. 497-505; 1981.

Coxhead, Averil; A New Academic Word List; TESOL Quarterly, 34(2); pp. 213-238; 2000.

Crossley, Scott, Dufty, David, McCarthy, Philip, McNamara, Danielle; Toward a New Readability: A Mixed Model Approach; In D.S. McNamara and G. Trafton (Eds.), Proceedings of the 29th Annual Conference of the Cognitive Science Society; Austin, TX; pp. 197-202; 2007.

Dale, Edgar, Chall, Jeanne; A Formula for Predicting Readability; Educational Research Bulletin, 27(1); pp. 11-28; 1948.

Davison, Alice, Kantor, Robert; On the Failure of Readability Formulas to Define Readable Text: A Case Study from Adaptations; Reading Research Quarterly, 17(2); pp. 187-209; 1982.

Deane, Paul, Sheehan, Kathleen, Sabatini, John, Futagi, Yoko, Kostin, Irene; Differences in Text Structures and Its Implications for the Assessment of Struggling Readers; Scientific Studies of Reading, 10(3); pp. 257-275; 2006.

DuBay, William; The Principles of Readability; Costa Mesa, CA: Impact Information; 2004.

Embretson, Susan, Wetzel, C. Douglas; Component Latent Trait Models for Paragraph Comprehension Tests; Applied Psychological Measurement, 11(2); pp. 175-193; 1987.

(56) References Cited

OTHER PUBLICATIONS

Flesch, Rudolf; A New Readability Yardstick; Journal of Applied Psychology, 32(30); pp. 221-233; 1948.

Flesch, Rudolf; The Art of Readable Writing; New York, NY: Collier Books; 1949.

Freedle, Roy, Kostin, Irene; The Prediction of SAT Reading Comprehension Item Difficulty for Expository Prose Passages; Report RR-91-29; Princeton, NJ: ETS; 1991.

Fry, Edward; A Readability Formula That Saves Time; Journal of Reading, 11; pp. 513-516; 1968.

Gorin, Joanna, Embretson, Susan; Item Difficulty Modeling of Paragraph Comprehension Items; Applied Psychological Measurement, 30(5); pp. 349-411; 2006.

Graesser, Arthur, McNamara, Danielle, Louwerse, Max; What Do Readers Need to Learn In Order to Process Coherence Relations in Narrative and Expository Text?; Ch. 5 In A.P. Sweet and C.E. Snow (Eds.), Rethinking Reading Comprehension; New York: Guilford Press; pp. 82-98; 2003.

Graesser, Arthur, McNamara, Danielle, Louwerse, Max, Cai, Zhiqiang; Coh-Metrix: Analysis of Text on Cohesion and Language; Behavioral Research, Methods, Instruments and Computers, 36(2); pp. 193-202; 2004.

Gunning, Robert; The Technique of Clear Writing; New York: McGraw-Hill International Book Co.; 1952.

Heilman, Michael, Collins-Thompson, Kevyn, Callan, Jamie, Eskenazi, Maxine; Combining Lexical and Grammatical Features to Improve Readability Measures for First and Second Language Texts; Proceedings of NAACL HLT 2007; pp. 460-467; 2007.

Heilman, Michael, Collins-Thompson, Kevyn, Eskenazi, Maxine; An Analysis of Statistical Models and Features for Reading Difficulty Prediction; Proceedings of the 46th Annual Meeting of the ACL; pp. 71-79; 2008.

Holland, V. Melissa; Psycholinguistic Alternatives to Readability Formulas; American Institutes for Research, Technical Report No. 12; 1981.

Kincaid, J. Peter, Fishburne, Robert, Rogers, Richard, Chissom, Brad; Derivation of New Readability Formulas (Automated Readability Index, Fog Count and Flesch Reading Ease Formula) For Navy Enlisted Personnel; Research Branch Report 8-75; Naval Air Station, Memphis, TN; 1975.

Kintsch, Walter, Yarbrough, J. Craig; Role of Rhetorical Structure in Text Comprehension; Journal of Educational Psychology, 74(6); pp. 828-834; 1982.

Kintsch, Walter; The Role of Knowledge in Discourse Comprehension: A Construction-Integration Model; Psychological Review, 95(2); pp. 163-182; 1988.

Kirsch, Irwin, Braun, Henry, Yamamoto, Kentaro, Sum, Andrew; America's Perfect Storm: Three Forces Changing Our Nation's Future; Report PCT-STORM; Princeton, NJ: ETS; 2007.

Klare, George; Readability; Ch. 22 In P.D. Pearson (Ed.), Handbook of Reading Research; New York, NY: Longman; pp. 681-744; 1984.

Kukan, Linda, Beck, Isabel; Thinking Aloud and Reading Comprehension Research: Inquiry, Instruction, and Social Interaction; Review of Educational Research, 67(3); pp. 271-299; 1997.

Lee, David; Defining Core Vocabulary and Tracking Its Distribution Across Spoken and Written Genres; Journal of English Linguistics, 29(3); pp. 250-278; 2001.

Leys, Margie, Fielding, Linda, Herman, Patricia, Pearson, P. David; Does Cloze Measure Intersentence Comprehension? A Modified Replication of Shanahan, Kamil, and Tobin; In J. Niles and L. Harris (Eds.), Searches for Meaning in Reading/Language Processing and Instruction: Thirty-Second Yearbook of the National Reading Conference; pp. 111-114; 1983.

Louwerse, Max, McCarthy, Philip, McNamara, Danielle, Graesser, Arthur; Variation in Language and Cohesion Across Written and Spoken Registers; In K. Forbus, D. Gentner, & T. Regier (Eds.), Proceedings of the 26th Annual Meeting of the Cognitive Science Society; pp. 843-848; 2004.

McCarthy, Philip, Graesser, Arthur, McNamara, Danielle; Distinguished Genre Using Coh-Metrix Indices of Cohesion; Annual Meeting of the Society for Text and Discourse; Minneapolis, MN; 2006.

McNamara, Danielle, Ozuru, Yasuhiro, Graesser, Arthur, Louwerse, Max; Validating Coh-Metrix; In R. Sun and N. Miyake (Eds.), Proceedings of the 28th Annual Conference of the Cognitive Science Society; Mahwah, NJ: Erlbaum; 2006.

McNamara, Danielle, Louwerse, Max, Graesser, Arthur; Coh-Metrix: Automated Cohesion and Coherence Scores to Predict Text Readability and Facilitate Comprehension; University of Memphis, Office of Educational Research; Sep. 2002-Aug. 2005.

Moreno, Roxana, Mayer, Richard; Engaging Students in Active Learning: The Case for Personalized Multimedia Messages; Journal of Educational Psychology, 92(4); pp. 724-733; 2000.

Pearson, P. David, Hamm, Diane; The Assessment of Reading Comprehension: A Review of Practices—Past, Present and Future; Ch. 2 In S. Paris and S. Stahl (Eds.), Children's Reading Comprehension and Assessment; Mahwah, NJ: Erlbaum; pp. 13-69; 2005.

Peterson, Sarah, Ostendorf, Mari; A Machine Learning Approach to Reading Level Assessment; University of Washington CSE Technical Report, 2006; Computer Speech and Language, 23; pp. 89-106; 2009.

Pitler, Emily, Nenkova, Ani; Revisiting Readability: A Unified Framework for Predicting Text Quality; Unpublished; 2008.

Powers, R.; Sumner, W., Kearl, B.; A Recalculation of Four Adult Readability Formulas; Journal of Educational Psychology, 49(2); pp. 99-105; 1958.

Reppen, Randi; Register Variation in Student and Adult Speech and Writing; Ch. 12 In S. Conrad and D. Biber (Eds.), Variation in English: Multi-Dimensional Studies; London: Longman; pp. 187-199; 2001.

Rog, Lori, Burton, Wilfred; Matching Texts and Readers: Leveling Early Reading Materials for Assessment and Instruction; International Reading Association, The Reading Teacher, 55(4); pp. 348-356; Dec. 2001-Jan. 2002.

\* cited by examiner

READING LEVEL ASSESSMENT METHOD, SYSTEM, AND COMPUTER PROGRAM PRODUCT FOR HIGH-STAKES TESTING APPLICATIONS

CROSS REFERENCE TO RELATED APPLICATIONS

This application is a continuation of U.S. patent application Ser. No. 12/363,243, filed Jan. 30, 2009, and entitled "Reading Level Assessment Method, System, and Computer Program Product for High-Stakes Testing Applications," which claims the benefit of and priority to U.S. Provisional Application No. 61/025,146, filed Jan. 31, 2008, the entirety of each of which is herein incorporated by reference.

FIELD OF THE INVENTION

This invention relates to automated text difficulty estimation, particularly estimation that yields text difficulty predictions expressed on a U.S. grade-level (GL) scale. The invention is designed to help teachers and assessment developers obtain immediate feedback about the expected U.S. GL of any electronically formatted text. The invention also provides feedback about the specific text characteristics that contribute to the difficulty prediction. Teachers and assessment developers can use this feedback to adapt text content so that resulting "adapted" texts are appropriately configured for readers at specific targeted reading GLs.

BACKGROUND

Many U.S. students graduate from high school without having acquired the reading skills needed to successfully participate in today's high-tech knowledge economy (Kirsch, Braun, Yamamoto & Sum, 2007). The No Child Left Behind legislation (NCLB, 2001) was designed to help states address this problem. The legislation requires educators to develop challenging academic content standards that clearly describe what students at different grade levels (GLs) are expected to know and be able to do in core academic areas like reading and math. The legislation also requires states to develop end-of-year accountability assessments that provide valid and reliable information about students' progress towards achieving those standards.

This application addresses an important component of the NCLB assessment development process: locating (or creating) reading passages that are closely aligned with the reading standards specified for students at successive grade-levels (GLs). The approach builds on previous research described in Sheehan, Kostin, Futagi, Hemat & Zuckerman (2006) and Sheehan, Kostin & Futagi (2007a, 2007b). That research culminated in the development of an automated text analysis system designed to help test developers locate appropriately targeted stimulus materials for use on different types of verbal reasoning assessments. Since the reading passages included on high-stakes assessments (e.g. those that factor into determining college admissions) are frequently adapted from previously published texts called sources, this system is called SourceFinder.

SourceFinder's existing text analysis modules account for differences in the source requirements specified for different types of assessments by evaluating candidate source documents multiple times. Results are then communicated to users via a set of acceptability ratings defined such that each individual rating reflects the acceptance criteria specified for a particular type of passage associated with a particular assessment program.

SourceFinder's original text analysis routines were designed to help test developers locate source texts for use on the Verbal Section of the Graduate Record Examination (GRE), an examination taken by students seeking admission to graduate school. Sheehan et al. (2007a, 2007b) compared SourceFinder's predictions of source acceptability to those provided by experienced human raters. The comparison was implemented on an independent cross-validation sample that included 1,000 candidate source texts that had each been rated by two experienced test developers. The analysis confirmed that SourceFinder's predictions of source acceptability behave much like the ratings provided by trained human raters. For example, while the human raters agreed with each other 63% of the time, the agreement between SourceFinder and a human rater ranged from 61% to 62%. These findings suggest that SourceFinder's automated text analysis routines have succeeded in capturing useful information about the characteristics of texts that affect test developers' ratings of source acceptability, at least for texts pitched at the advanced proficiency level targeted by the GRE.

[Note, although the test developers' ratings were originally expressed on a five-point scale where 1=Definitely Reject, 2=Probably Reject, 3=Uncertain, 4=Probably Accept, and 5=Definitely Accept, Levels 1 and 2 were subsequently collapsed to form a single "Reject" category, and Levels 4 and 5 were subsequently collapsed to form a single "Accept" category. The evaluation was implemented on the resulting three-point scale.]

This application describes an automated text analysis module that provides text reading difficulty estimates expressed on a U.S. grade level (GL) scale. The capability is designed to help teachers and assessment developers locate (or create) texts appropriate for use on reading assessments targeted at students in grades 3 through 12. Before describing the many innovative aspects of this new capability, we provide a brief review of existing approaches for assessing text reading difficulty.

A Review of Existing Approaches for Assessing Text Reading Difficulty

Early attempts to assess text reading difficulty are reviewed in Klare (1984). Four popular approaches are described: the Flesch Reading Ease Index (Flesch, 1948), the Dale-Chall Readability Formula (Chall & Dale, 1948), the Fry Index (Fry, 1968), and the Flesch-Kincaid GL Score (Dubay, 2004, pp. 49-51). These four approaches, also called readability formulas, are alike in that, in each case, text difficulty is determined from just two independent variables: a single measure of syntactic difficulty and a single measure of semantic difficulty. In all four approaches average sentence length is taken as the single measure of syntactic difficulty. The approaches differ in terms of the specific features selected for use in measuring semantic difficulty. In three of the approaches, i.e., Flesch, Flesch-Kincaid, and Fry, semantic difficulty is assessed via average word length measured in syllables. In the Dale-Chall formula, semantic difficulty is assessed via the average frequency of words expected to be familiar to young readers. In the original Dale-Chall formula, word familiarity was assessed via a 1974 list of words found to be very familiar to fourth-grade students. In a revised version of the Dale-Chall formula published in 1995, semantic difficulty is assessed via an updated list of 3,000 words found to be very familiar to fourth grade students (Chall & Dale, 1995, pp. 16-29).

A number of additional readability formulas have been published. These include the Powers, Sumner, Kearl Readability Formula (Dubay, 2004, pp. 43-45), the Coleman Liau Formula (Coleman & Liau, 1975), the Bormuth Formula (Dubay, 2004, pp. 43-45) and the Gunning FOG formula (Gunning, 1952, pp. 29-39). As in the formulas discussed above, these additional formulas capture just two aspects of text variation: syntactic complexity, measured via average sentence length, and semantic difficulty, measured via average word length and/or average word familiarity.

A characteristic shared by all of the formulas discussed above is that, in each case, only a limited amount of computing power is needed for feature extraction. In 1988, Stenner, Horabin, Smith and Smith proposed an updated text difficulty prediction system that was designed to take advantage of recent increases in computing power. This new system, termed the Lexile Framework, is now widely used in elementary and middle school classrooms throughout the United States. Like the early readability formulas discussed above, however, the Lexile Framework considers just two aspects of text variation: syntactic difficulty and semantic difficulty. Syntactic difficulty is assessed via log average sentence length, and semantic difficulty is assessed by first using a word frequency index to assign an individual frequency estimate to each word in the text, and then averaging over those estimates to obtain a single, text-level estimate of reading difficulty. The individual word frequency estimates employed in the calculations were developed from a large corpus of natural language text selected to represent the reading materials typically considered by students in their home and school-based reading.

Although the approaches discussed above have been frequently praised for being both helpful and easy to use, a number of limitations have also been noted. One important limitation is that, as is noted above, only two dimensions of text variation are considered: syntactic difficulty and semantic difficulty. Sawyer (1991) argues that this simple model of text difficulty is "misleading and overly simplistic" (p. 309). Similarly, Coupland (cited in Klare, 1984) notes that "the simplicity of . . . readability formulas . . . does not seem compatible with the extreme complexity of what is being assessed" (p. 15). Holland (1981) reports a similar conclusion, "While sentence length and word frequency do contribute to the difficulty of a document, a number of equally important variables elude and sometimes run at cross purposes to the formulas . . . " (p. 15)

Perhaps the most worrisome criticisms have been voiced by researchers who have attempted to manipulate text difficulty by manipulating sentence length and word familiarity. For example, Beck, McKeown & Worthy (1995) reported that, contrary to expectation, texts that were revised to include shorter sentences and more familiar words tended to yield decreases in comprehension, not increases. Similar results are reported in Britton & Gulgoz (1991) and in Pearson & Hamm (2005).

Researchers have also argued that a key limitation of existing readability formulas is their inability to account for discourse level factors such as the amount of referential cohesion present in a text (Graesser, McNamara, Louwerse & Cai, 2004; McNamara, Ozuru, Graesser & Louwerse, 2006; Crossley, Dufty, McCarthy & McNamara, 2007). McNamara, et al. (2006) define referential cohesion as the extent to which sentences appearing later in a discourse refer back to sentences appearing earlier in the discourse. They note that a referentially cohesive text spells out what another text might leave implicit, thereby reducing the need for bridging inferences. For this reason, texts with higher levels of referential cohesion are expected to be easier to comprehend than texts with lower levels of referential cohesion.

Graesser, et al. (2004) describe an automated text analysis system designed to measure various types of text cohesion. This new system is called Coh-Metrix in order to emphasize the crucial role of cohesion variation is determining text difficulty. Coh-Metrix includes 40 different indices of text cohesion. McNamara, et al. (2006) examined the performance of these indices relative to the task of detecting intentional cohesion manipulations made by experts in text comprehension. The experts created two versions of each of 19 different texts: a low-cohesion version and a high-cohesion version. The performance of each index relative to the task of distinguishing between these two versions was then examined. Significant differences were observed for 28 of the 40 indices. Importantly, however, neither Graesser et al. (2004) nor McNamara et al. (2006) proposed a new readability formula. Rather, each group focused exclusively on the development and evaluation of alternative approaches for measuring text cohesion.

A subsequent analysis of Coh-metrix features is reported in Crossley, et al. (2007). These researchers investigated whether Coh-metrix indices of referential cohesion could yield improved estimates of text readability when considered in combination with the classical readability features of average sentence length and average word frequency. The analysis suggested that a strategy of adding a measure of referential cohesion to a model that already includes measures of average sentence length and average word frequency would, in fact, contribute to enhanced predictive accuracy.

A three feature model is also presented in Sheehan, Kostin, Futagi & Sabatini (2006). In addition to measures of syntactic complexity and semantic difficulty, their model also includes a measure of the prevalence of linguistic structures that are known to be more characteristic of spontaneous spoken language than of printed language Innovative estimation techniques designed to accommodate even larger numbers of independent variables have also been considered. For example, Petersen and Ostendorf (2006) describe a support vector machine designed to classify texts as either appropriate or not appropriate for students reading at any of four different grade levels ranging from second to fifth grade. Their approach considers a total of 26 features, including 20 different measures of vocabulary usage, and six different measures of syntactic complexity.

The ability to consider large numbers of independent variables simultaneously is also a feature of the text analysis system described in Heilman, Collins-Thompson, Callan & Eskenazi (2007). These authors employed a Naïve Bayes approach to simultaneously evaluate a large number of lexical features (i.e., word unigrams) and a large number of grammatical features (i.e., frequencies of grammatically complex constructions.) Similar findings are reported in Heilman, Collins-Thompson & Eskenazi (2008), i.e., models composed of word unigrams and frequencies of grammatical constructions proved effective at predicting human judgments of text GL.

The reading level assessment system described in Sheehan, Kostin & Futagi (2007c) also incorporates a large number text features. That system is unique in that (a) a tree-based regression approach is used to model text difficulty, and (b) distinct models are provided for literary and expository texts.

Limitations of Existing Approaches

Each of the approaches reviewed above suffers from one or more of the following limitations:

(1) The approach does not provide difficulty predictions expressed on a GL scale that is aligned with published state reading standards.

(2) The approach does not account for the fact that many important linguistic features interact significantly with genre.
(3) The approach does not account for the fact that many important linguistic features exhibit strong intercorrelations.
(4) The approach considers just two dimensions of text variation: syntactic complexity and semantic difficulty.
(5) The approach does not provide feedback for use in adapting text content so that resulting "adapted" texts are more appropriately configured for students reading at particular targeted reading GLs.

Additional information about each limitation is summarized below.

Limitation #1: The Specified GL Scale is Not Aligned with Published State Reading Standards Every modeling application requires an approach for ensuring that the predictions generated by the model are reported on an appropriate scale. Defining an appropriate prediction scale for a text difficulty modeling application is particularly challenging because (a) the "true" difficulty level of a passage is never directly observed, and (b) in some cases, there is a further requirement that the application yield text difficulty predictions that are reasonably well aligned with published state reading standards.

In many of the prediction models reviewed above, output predictions are reported on a U.S. GL scale. Four different techniques have been used to establish these scales: (a) doze fill-in rates; (b) small-scale rating studies; (c) item difficulty studies; and (d) Web downloads. These four techniques are described below.

Validation information collected via a doze fill-in approach is reported for a number of different models including the Bormuth readability formula, (Dubay, 2004, pp. 43-45) the Dale-Chall readability formula (Chall and Dale, 1995, pp. 1-44, 55-66) and the model presented in Crossley, et al. (2007). A modified doze fill-in approach is one of several approaches used to validate the Lexile Framework (Stenner, et al., 1988).

The basic doze fill-in approach includes three steps: first, passages are administered with every fifth word deleted and examinees are asked to "fill-in" the missing words; second, the average probability of a correct fill-in is calculated for each passage; and third, a linking procedure is used to re-express the resulting probability estimates on a U.S. GL scale. Note that the validity of this approach rests on the assumption that passages with high fill-in probabilities are easier to comprehend, while passages with low fill-in probabilities are harder to comprehend. Shanahan, Kamil, and Tobin (1983) evaluated this assumption by comparing students' performances on doze items administered under four different passage conditions:
(a) intact passages;
(b) scrambled passages (with sentences randomly reordered);
(c) intermingled passages (with sentences from different passages interspersed); and
(d) eclectic passages (collections of unrelated sentences).

After observing similar doze fill-in rates under all four conditions, Shanahan et al. (1983) concluded that doze fill-in rates do not provide useful information about "intersentential" comprehension, that is, comprehension that requires integrating information across sentence boundaries. This suggests that, while doze fill-in rates may provide useful information about the difficulties experienced by readers when attempting to comprehend the individual sentences in a text, they do not provide useful information about the difficulties experienced by readers when attempting to infer connections between sentences. This finding was later replicated by Leys, Fieding, Herman & Pearson (1983). Kintsch and Yarbrough (1982) reported a related finding, i.e., doze fill-in rates failed to distinguish passages classified as requiring low or high levels of macroprocessing, i.e., processing directed at developing a useful mental model of the information presented in a text.

Responses to multiple-choice reading comprehension items have also been used to establish output scales for text difficulty modeling applications (e.g., Chall and Dale, 1995; Stenner 1996). In this approach, the "true" difficulty level of a text is estimated from the average difficulty of its associated items and a linking technique is used to re-express the resulting difficulty predictions on a U.S. GL scale. A problem with this approach is that, while item difficulty is surely related to passage difficulty, several previous studies have suggested that difficulty estimates developed for multiple choice reading comprehension items also incorporate variation due to non-passage factors such as distractor plausibility, where the term "distractor" refers to the incorrect options that are presented along with the correct option. (Embretson & Wetzel, 1987; Freedle & Kostin, 1991; Gorin & Embretson, 2006; Sheehan, Kostin & Persky, 2006.)

Small scale rating studies have also been used to establish scales for use with automated text difficulty prediction systems. For example, Pitler & Nenkova (2008) created a five point difficulty scale by asking a group of three college students to rate each of 30 different Wall Street Journal articles on a 1-5 scale. Such scales suffer from each of the following limitations: (a) sample sizes are typically quite small (e.g., just 30 in the Pitler example); (b) interpretation is problematic (e.g., What does a difficulty estimate of "5" mean?); (c) ratings are not generated in a high-stakes environment; and (d) resulting text difficulty classifications are not aligned with published state reading standards.

Researchers have also generated text difficulty scales from GL classifications provided by textbook publishers or Web content providers. The training data described in Heilman et al. (2007) and Heilman, et al. (2008) illustrate this approach. In each case, training texts were downloaded from Web pages classified as appropriate for readers at specified GLs. Of the 289 texts collected in this manner, approximately half were authored by students at the specified GL, and half were authored by teachers or writers. In each case, either the text itself, or a link to it, identified the text as appropriate for students at a particular GL. This approach offers two advantages: (a) it is capable of yielding large numbers of training documents, and (b) it provides text difficulty classifications that capture variation due to both inter and intra-sentential comprehension. But certain limitations also apply: (a) difficulty classifications are not generated in a high stakes environment, (b) classification procedures are not published (so that the specific factors considered during text classification are not known and users have no way of determining whether the resulting predictions are aligned with published state reading standards) and (c) there is no preset process for detecting and correcting misclassifications.

As the above summary suggests, the lack of a carefully developed, well-aligned set of training texts is a serious weakness of many existing approaches for predicting text reading difficulty.

Limitation #2: Estimation Methodologies are Not Designed to Account for Interactions with Text Genre Research conducted over the past 20 years suggests that many important predictors of text difficulty interact significantly with text genre. This research includes a host of studies documenting significant differences in the characteristics of informational and literary texts, and in the strategies adopted by readers during the process of attempting to make sense of these two types of texts. Differences have been reported in the frequency of "core" vocabulary words (Lee, 2001); in the way that cohesion relations are expressed (McCarthy, Graesser & McNamara, 2006); in the types of comprehension strategies utilized (Kukan & Beck, 1997); in the rate at which individual paragraphs are read (Zabrucky & Moore, 1999); in the types of inferences generated during reading (van den Broek, Everson, Virtue, Sung & Tzeng, 2002); and in the type of prior knowledge accessed during inference generation (Best, Floyd & McNamara, 2004).

Several explanations for these differences have been proposed. In one view, literary texts (e.g., fictional stories and memoirs) are said to require different processing strategies because they deal with more familiar concepts and ideas (Graesser, McNamara & Louwerse, 2003). For example, while many literary texts employ familiar story grammars that are known to even extremely young children, informational texts tend to employ less well known structures such as cause-effect, comparison-contrast, and problem-resolution.

Genre-specific processing differences have also been attributed to differences in the types of vocabularies employed. For example, Lee (2001) examined variation in the frequency of "core" vocabulary words within a corpus of informational and literary texts that included over one million words downloaded from the British National Corpus. Core vocabulary was defined in terms of a list of 2000 common words classified as appropriate for use in the dictionary definitions presented in the Longman Dictionary of Contemporary English. The analyses demonstrated that core vocabulary usage was higher in literary texts than in informational texts. For example, when literary texts such as fiction, poetry and drama were considered, the percent of total words classified as "core" vocabulary ranged from 81% to 84%. By contrast, when informational texts such as science and social studies texts were considered, the percent of total words classified as "core" vocabulary ranged from 66% to 71%. In interpreting these results Lee suggested that the creativity and imaginativeness typically associated with literary writing may be less closely tied to the type or level of vocabulary employed and more closely tied to the way that core words are used and combined. Note that this implies that an individual word detected in a literary text may not be indicative of the same level of processing challenge as that same word detected in an informational text.

Significant genre-related differences have also been reported in more recent corpus-based analyses. For example, McCarthy et al. (2006) reported higher levels of referential cohesion in expository texts as compared to narratives even though the two corpora studied were targeted at equivalent populations of readers, i.e., students in grades kindergarten through college. These results suggest that it may also be the case that a particular level of referential cohesion detected in an expository text may not necessarily be indicative of the same type of processing challenge as that same level detected in a narrative text.

Explanations of informational/literary processing differences have also been cast in terms of the processing distinctions emphasized in Kintch's (1988) model of reading comprehension. That model, termed the Construction Integration Model, posits three separable, yet interacting processing levels. First, word recognition and decoding processes are used to translate the written code into meaningful language units called propositions. Next, interrelationships among the propositions are clarified. Depending on the characteristics of the text and the reader's goals, this processing could involve reader-generated bridging inferences designed to fill in gaps and establish coherence. Kintsch argues that this process culminates in the development of a network representation of the text called the textbase. While only text-based inferences are generated during the construction of the textbase, knowledge-based inferences may also be needed to completely satisfy a reader's goals. Consequently, a third level of processing is also frequently implemented. This third level involves reconciling the current text with relevant prior knowledge and experience to provide a more complete, more integrated model of the situation presented in the text, i.e., what Kintsch terms the situation model.

Best, et al. (2004) discuss differences in the type of prior knowledge accessed during situation model development for expository vs. narrative texts. They note that, for expository texts, situation model processing involves integrating the textbase with readers' prior knowledge of the subject matter, and since a given reader's prior knowledge may not always be sufficient, resulting situation models may fail to maintain the author's intended meaning. For narrative texts, by contrast, situation model processing typically involves generating inferences about the characters, settings, actions and events in the reader's mental representation of the story, an activity that is much less likely to be affected by deficiencies in required prior knowledge.

Although few would dispute the informational/literary distinctions summarized above, text difficulty models that account for these differences are rare. In particular, in all but one of the text difficulty predictions systems reviewed above, a single prediction equation is assumed to hold for both informational and literary texts. The one exception to this trend in the difficulty model described in Sheehan, Kostin & Futagi (2007c) which provides two distinct difficulty models: one optimized for informational texts and one optimized for literary texts.

Limitation #3: Estimation Procedures are Not Designed to Account for the Strong Intercorrelations that May Exist Among Important Text Features The extreme complexity of the reading comprehension process suggests that large numbers of text features may be needed to adequately explain variation in text difficulty. In many popular difficulty modeling approaches, however, models are estimated from a mere handful of text features. For example, both the Flesch-Kincaid GL Score and the Lexile Framework rely on just two features. This surprising result may be due to the difficulty of accounting for the strong intercorrelations that are likely to exist among many related text features.

Biber (1986, 1988) and Biber, Conrad, Reppen, Byrd, Helt, Clark (2004) describe an approach for characterizing text variation when the available text features exhibit strong intercorrelations. In this approach, corpus-based multidimensional techniques are used to locate clusters of features that simultaneously exhibit high within-cluster correlation and low between-cluster correlation. Linear combinations defined in terms of the identified feature clusters are then employed for text characterization. Biber and his colleagues justify this approach by noting that (a) because many important aspects of text variation are not well captured by individual linguistic features, investigation of such characteristics requires a focus on "constellations of co-occurring linguistic features" as opposed to individual features, and (b) multidimensional techniques applied to large representative corpora may help researchers better understand and interpret those constellations by allowing patterns of linguistic co-occurrence to be analyzed in terms of underlying dimensions of variation that are identified quantitatively.

In Biber et al. (2004), a corpus-based multidimensional approach is applied to the problem of selecting texts appropriate for use on the Test of English as a Foreign Language (TOEFL). System development involved first using a principal factor analysis to develop linear combinations of text features for use in text evaluation, and then using the resulting "dimension scores" to compare candidate texts to existing TOEFL passages. Sheehan, et al. (2007a, 2007b) employ a similar approach to define independent variables for use in modeling the acceptability status of candidate source texts selected for use on the GRE Verbal Section. Dimension scores developed in a multidimensional analysis of a large corpus have also been used to examine differences in the patterns of text variation observed in reading materials classified as exhibiting low or high Lexile Scores (Deane, Sheehan, Sabatini, Futagi and Kostin, 2006). And finally, Louwerse, McCarthy, McNamara and Graesser (2004) employ a similar approach to examine variation in a set of cohesion indices.

In considering the analyses summarized above it is important to note that, while each employed linear combinations of correlated text features to explore some aspect of text variation, none of these previous applications were designed to predict variation in text difficulty, and none provide text GL predictions that are reflective of the GL distinctions specified in published state reading standards.

Limitation #4: Only Two Dimensions of Text Variation are Considered: Syntactic Complexity and Semantic Difficulty Early efforts to automatically assess text difficulty focused on two particular dimensions of text variation: syntactic complexity and semantic difficulty. While innovative approaches for measuring these two important dimensions continue to be published, attempts to measure additional dimensions are rare. Text processing models such as Kintsch's Construction Integration model (1988) suggest that text difficulty prediction models that measure additional dimensions of text variation, over and above the traditional readability dimensions of syntactic complexity and semantic difficulty, may provide more precise information about the aspects of text variation that account for students' observed comprehension difficulties.

Limitation #5: Feedback is Not Designed to Help Users Develop High Quality Text Adaptations Text adaptation is the process of adjusting text characteristics so that the resulting "adapted" text exhibits combinations of features that are characteristic of a particular targeted GL. Previous research has suggested that (a) adaptation strategies developed from overly simplistic models of text variation can result in adapted texts that are not characteristic of targeted GLs, and (b) such texts frequently fail to elicit the types of performances expected of students with known proficiency profiles (Beck, et al. 1995; Britton & Gulgoz, 1991; Pearson & Hamm, 2005). Text reading difficulty models that are more reflective of the patterns of text variation observed in naturally occurring texts may yield feedback that is more appropriate for use in text adaptation activities.

The research summarized above highlights the need for a text reading difficulty prediction module that (a) yields text reading difficulty predictions expressed on a U.S. GL scale that is reasonably well aligned with published state reading standards; (b) accounts for the fact that many important linguistic features interact significantly with text genre; (c) accounts for the fact that many important linguistic features exhibit strong intercorrelations; (d) addresses multiple aspects of text variation, including aspects that are not accounted for by the classic readability dimensions of syntactic complexity and semantic difficulty, and (e) provides feedback for use in creating high quality text adaptations.

This application describes a new text reading difficulty prediction module designed to address these concerns.

SUMMARY

Embodiments of the invention include a computer-implemented method, system, and computer program product for text passage difficulty estimation in which a text passage is input for analysis, and reading difficulty estimates expressed on a U.S. GL scale are produced as output. The approach includes the following novel elements:
(1) The training passages considered during model estimation are selected from high-stakes accountability assessments targeted at students in grades 3 through 12, and an "inheritance principle" is used to assign a GL classification to each text. This innovation ensures that resulting text difficulty predictions are expressed on a U.S. GL scale that is reasonably well aligned with published state reading standards.
(2) Two distinct difficulty models are provided: one optimized for application to informational texts, and one optimized for application to literary texts. This innovation ensures that key feature-genre interactions are properly accounted for.
(3) A principal components analysis implemented on a large collection of appropriately targeted texts is used to develop independent variables that account for the strong intercorrelations that are likely to exist among many important linguistic features.
(4) Multiple dimensions of text variation are assessed, including novel dimensions such as the degree of academic orientation detected in a text, and the degree of negation detected in a text.
(5) Feedback about text difficulty is provided in a hierarchically structured format designed to support successful text adaptation efforts.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
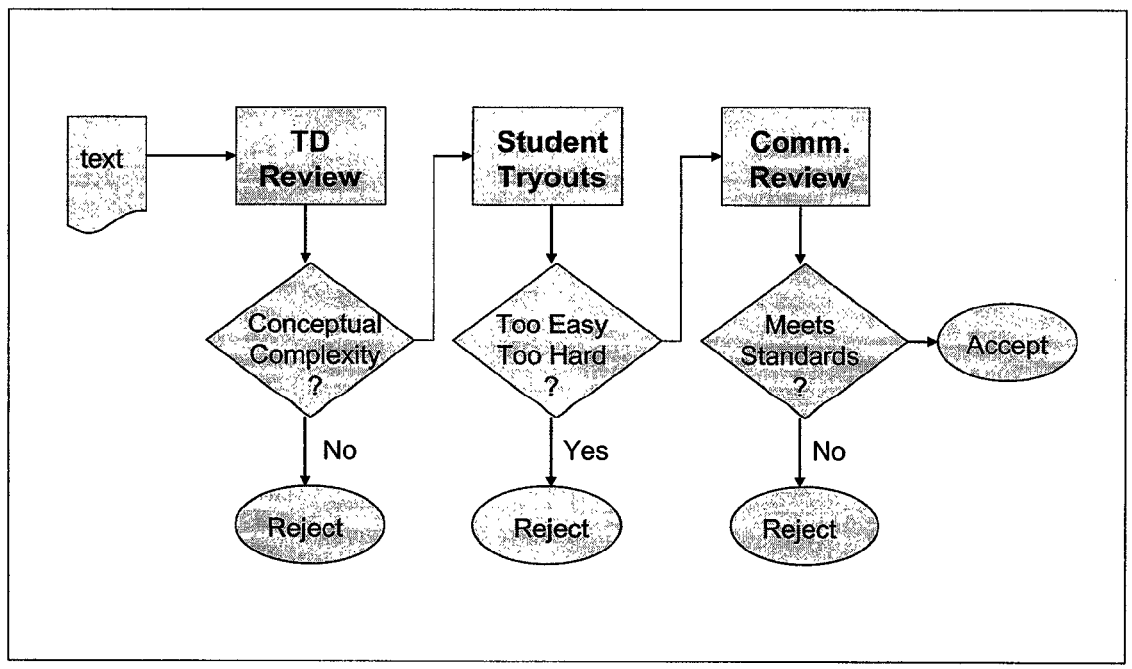
FIG. 1 illustrates the three types of passage reviews that are commonly implemented by professional assessment developers when selecting passages for use on high-stakes reading comprehension assessments.

The present invention is designed to address each of the limitations noted above. The invention was developed in five steps, as summarized below.

Step 1. A corpus of training documents for use in model estimation and validation is assembled. The corpus is designed to ensure that text difficulty predictions are expressed on a U.S. GL scale that is reasonably well aligned with published state reading standards.

Step 2. A technique that accounts for the fact that many important linguistic features interact significantly with text genre is implemented. The technique is based on an analysis of the genre effects detected in a subset of ten key features. That analysis, and the estimation approach developed as a result of the analysis, are summarized below.

Step 3. A principal components analysis is used to define linear combinations of correlated text features for use as candidate independent variables. The analysis is implemented on a large corpus of texts selected to represent the reading materials typically considered by students in grades 3 through 12.

Step 4. A linear regression approach is used to define two distinct prediction models: one optimized for application to informational texts, and one optimized for application to literary texts.

Step 5. Three types of feedback are provided: (a) feedback about the overall expected difficulty level of a text; (b) feedback about text standing on each of the dimensions assumed to be contributing to the observed text difficulty variation; and (c) feedback about the individual text features considered during the dimension score calculation. This hierarchically-structured feedback is designed to help users quickly zero in on a subset of text features with good prospects for adjusting difficulty in the desired direction. Additional information about each step is provided below.

Step 1: Assembling a Database of Training Documents for Use in Model Development and Validation While few would dispute the claim that the validity of an automated scoring module is limited to the validity of its underlying training data, as was demonstrated in the above review, existing approaches for automatically assessing text reading level are based on training corpora that incorporate a number of serious weaknesses. The training corpus developed for use in the current invention is described in this section. This new type of training data is designed to yield GL predictions that are reflective of the aspects of text variation deemed appropriate for readers at successive GLs in the range from $3^{rd}$ to $12^{th}$ grade, as specified in published U.S. state reading standards.

The SourceFinder training corpus was assembled as follows. First, we collected over 500 reading passages from a set of high-stakes reading comprehension assessments targeted at students in grades 3 through 12. The resulting corpus includes passages designed to represent the published reading standards in 17 different U.S. states. Passages from additional states will be added as time permits.

Two types of passages are included: informational passages such as the introductory sections of science, social studies and humanities textbooks; and literary passages such as fictional narratives, folk tales and memoirs. Passages range in length from 145 words to 2,500 words. The mean passage length is approximately 600 words.

Second, a GL classification was developed for each passage by adopting an "inheritance principle" which stated that the GL classification of a passage could be inherited from the GL classification of its parent test form. Note that the resulting GL classifications have each of the following properties:

(1) Classifications were developed and reviewed by distinguished educators working within high-stakes assessment development environments.

(2) Classifications reflect the GL standards specified in published state guidelines that have been reviewed by large numbers of concerned stake-holders.

(3) Classifications capture both intersentential and intrasentential effects.

(4) Multiple opportunities are available for detecting and correcting classification errors. For example, as is shown in FIG. 1, passages that are either too easy or too hard for the targeted population of readers would likely be detected and corrected during the student tryout phase of the passage development process. Similarly, passages that fail to reflect key state reading standards would likely be detected, and possibly reclassified, during the committee review phase of the test development process.

The resulting corpus is summarized in Table 1.

TABLE 1

The ETS Passage Corpus

| Grade Level | No. of Informational Passages | No. of Literary Passages | Total |
|---|---|---|---|
| 3 | 34 | 44 | 78 |
| 4 | 31 | 54 | 85 |
| 5 | 31 | 30 | 61 |
| 6 | 23 | 22 | 45 |
| 7 | 26 | 43 | 69 |
| 8 | 39 | 34 | 73 |
| 9 | 22 | 16 | 38 |
| 10 | 22 | 40 | 62 |
| 11 | 12 | 20 | 32 |
| 12 | 3 | 2 | 5 |
| Total | 243 | 305 | 548 |

Step 2: Accounting for Variation Due to Differences in Text Genre

Over a dozen reading difficulty prediction systems were reviewed during the process of developing this invention. In each of those systems, a single prediction equation was assumed to hold for both informational and literary texts. Since this approach is at odds with a large body of literature documenting significant differences in the processes engaged when reading informational vs. literary texts, an analysis was implemented to determine an appropriate approach for accounting for text genre effects.

The analysis considered an earlier version of the ETS Passage Corpus that included a total of 374 passages: 171 informational passages, and 203 literary passages. This subset was designed to represent the reading standards in three particular U.S. states: California, Michigan and Maine. As in the current corpus, passage GL classifications were developed by reading experts operating in a high-stakes assessment development environment and resulting passage GL classifications ranged from $3^{rd}$ to $12^{th}$ grade.

The analysis considered ten widely-used measures of text variation: average word length measured in log syllables; average word frequency determined from the TASA Word Frequency Index (Touchstone Applied Science Associates, Zeno, Ivens, Millard, & Duvvuri (1995)); average word frequency determined from a second word frequency index developed from a version of the Lexile Corpus provided by the Metametrics Corporation; average sentence length measured in log words, and six measures of referential cohesion. Each cohesion measure provides an estimate of the average number of sentences classified as exhibiting noun overlap with preceding sentences. The measures differ with respect to whether word overlap is calculated with or without stemming, and whether the look-back window (LBW) includes 1, 2 or 3 preceding sentences. [Note: Stemming refers to the process of treating inflected forms of a word, e.g, hat and hats, as equivalent. The LBW specifies the number of preceding sentences to search when looking for overlapping words or word stems.] McNamara et al. (2006) argued that these particular measures constitute the "most discriminative" approach for distinguishing texts with low and high levels of cohesion.

Genre effects were evaluated by fitting the following linear model to the full set of 374 passages:

$$y_i = \beta_0 + \beta_{0,inf} x_{0i} + \beta_1 x_{1i} \beta_{1,inf}(x_{0i}*x_{1i}) + \epsilon_i \quad (1)$$

where $y_i$ is the observed GL of the $i^{th}$ text, $x_{0i}$ is an indicator variable coded as 1 for informational texts and 0 for literary texts, and $x_{1i}$ represents one or another of the ten candidate features discussed above (i.e., a measure of vocabulary difficulty, syntactic complexity or referential cohesion.) Note that this model permits evaluation of two different types of genre effects: effects that function independently of $x_1$ and effects that vary linearly with $x_1$.

The practical effects of failing to account for variation due to differences in text genre are evaluated by first estimating the above model with $\beta_{0,inf}$ and $\beta_{1,inf}$ excluded to obtain a non-genre-specific $\hat{y}_i$ for each text, and then calculating mean differences separately for informational and literary texts as follows:

$$\text{Bias(Inf)} = 1/171 \Sigma(\hat{y}_i - y_i), \text{ for } i=1, \ldots, 171$$

$$\text{Bias(Lit)} = 1/203 \Sigma(\hat{y}_i - y_i), \text{ for } i=172, \ldots, 374. \quad (2)$$

Note that a positive bias value is indicative of a prediction equation that systematically overestimates text difficulty, and a negative bias value is indicative of a prediction equation that systematically underestimates text difficulty.

Model coefficients estimated via equation (1) are summarized in Table 2. The column labeled $\beta_1$ confirms that, as expected, each of the selected features varies linearly with GL in the expected direction. That is, on average, GL increases with average word length and average sentence length, and decreases with average word frequency as determined from either the TASA Word Frequency (WF) Index or the Lexile WF Index, and with each of the six measures of referential cohesion. Note that these results are consistent with the theoretical model of text comprehension summarized above.

TABLE 2

Model Coefficients, Significance Probabilities and Expected Genre Biases For Measures of Vocabulary Difficulty, Syntactic Complexity and Referential Cohesion

| Model | $\beta_1$ | $\beta_{0,inf}$ | $\beta_{1,inf}$ | Bias (Inf) | Bias (Lit) |
|---|---|---|---|---|---|
| Vocabulary Difficulty | | | | | |
| Avg. Word Length (ls) | 61.58*** | −10.24** | 21.93* | +0.72 | −0.60 |
| Avg. TASA WF | −0.57*** | 13.48* | −0.24* | +0.54 | −0.45 |
| Avg. Lexile WF | −0.55*** | 1.42* | −0.05 | +0.73 | −0.61 |
| Syntactic Complexity | | | | | |
| Avg. Sentence Length (lw) | 12.07*** | −6.21*** | 4.68** | +0.30 | −0.26 |
| Referential Cohesion | | | | | |
| Stemming = No, LBW = 1 | −3.22** | −0.74 | 3.42** | −0.05 | +0.06 |
| Stemming = No, LBW = 2 | −3.56*** | −1.12* | 3.52*** | −0.14 | +0.12 |
| Stemming = No, LBW = 3 | −2.77*** | −1.07* | 2.70*** | −0.13 | +0.11 |
| Stemming = Yes, LBW = 1 | −2.67** | −0.51 | 2.42** | −0.06 | +0.07 |
| Stemming = Yes, LBW = 2 | −3.06*** | −1.04* | 3.04** | −0.11 | +0.10 |
| Stemming = Yes, LBW = 3 | −2.43*** | −1.03* | 2.41** | −0.11 | +0.10 |

Note.
WF = Word Frequency,
ls = log syllables,
lw = log words,
LBW = Look-back Window.
All biases are expressed on a GL scale.
*p < .10,
**p < .05,
***p < .01.

Table 2 also shows that significant interactions with text genre were detected for each of the ten features. In particular, $\beta_{0,inf}$ is significant for eight of the ten features, and $\beta_{1,inf}$ is significant for each of the features except the Lexile WF feature. These results suggest that models of text difficulty that include any of these ten features without also accounting for variation due to differences in text genre run the risk of yielding predictions of text GL that incorporate significant genre biases.

Table 2 also shows the direction and magnitude of the biases estimated for each feature. Note that all three of the vocabulary features yielded positive bias for informational texts and negative bias for literary texts while all six of the referential cohesion measures yielded negative bias for informational texts and positive bias for literary texts. This high level of consistency suggests that the estimated effects are due to substantial differences in the semantic and rhetorical characteristics of informational and literary texts, rather than idiosyncratic aspects of our particular feature extraction approaches.

Figure 2:
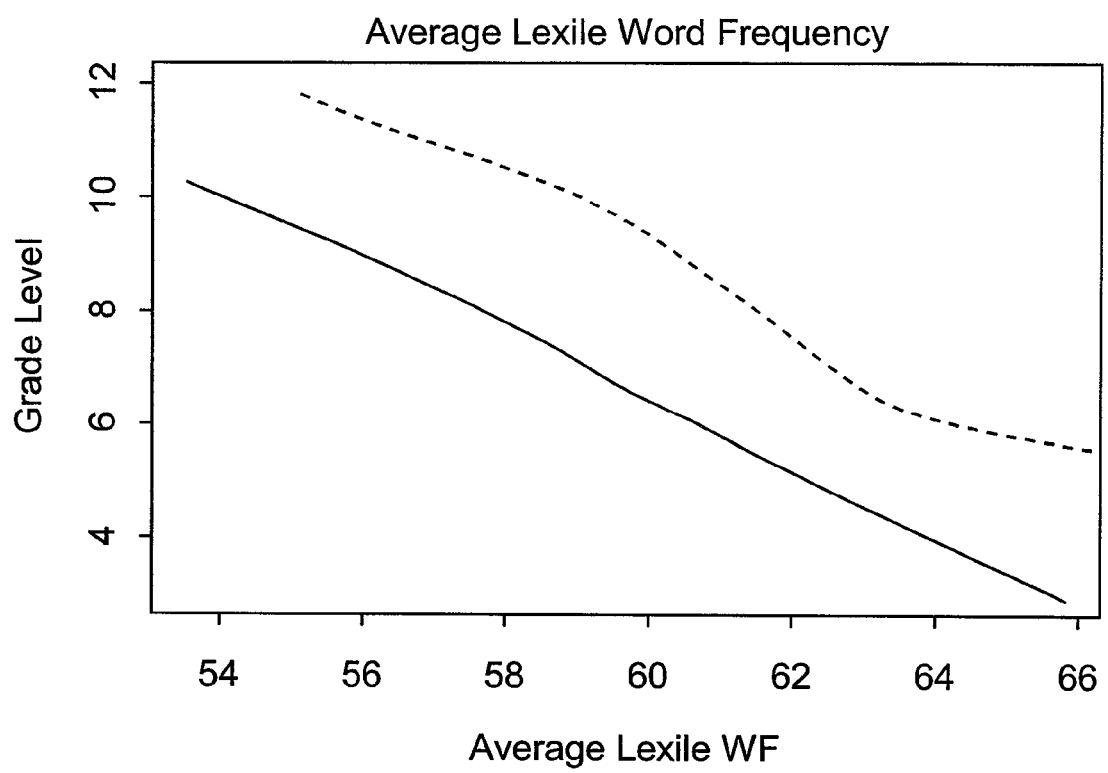
FIG. 2 is a graph that depicts trends in grade level variation as a function of average word frequency as determined from the Lexile Word Frequency Index. Trends for informational texts (n=171) are plotted with a solid line; trends for literary tests (n=203) are plotted with a dashed line.
Figure 3A:
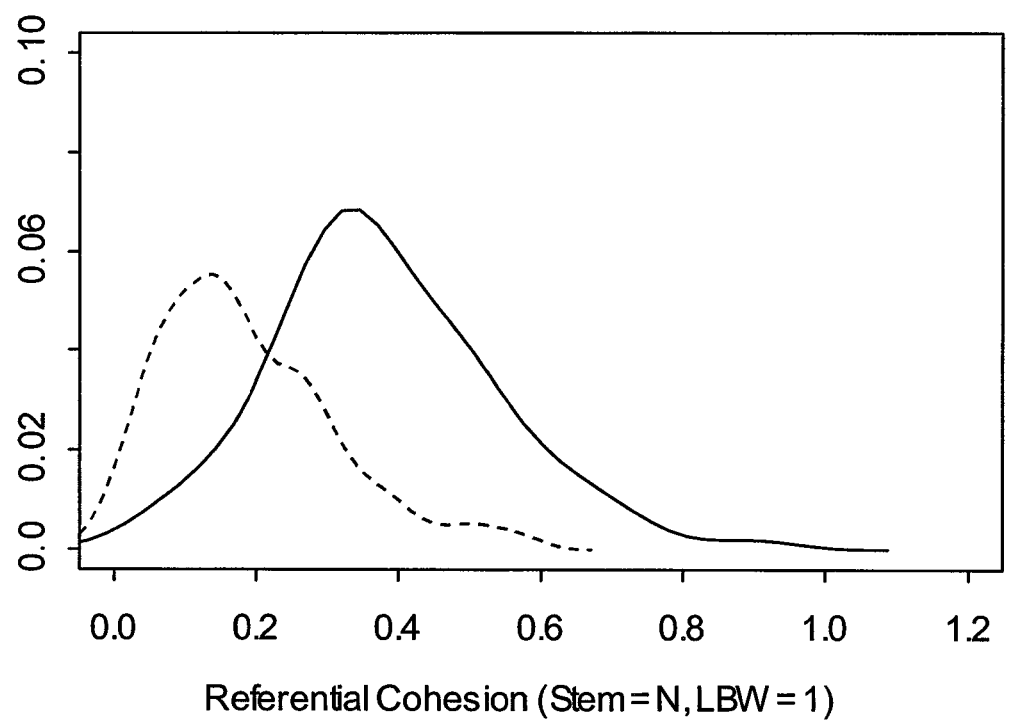
FIGS. 3A through 3F are graphs that depict the distribution of referential cohesion values obtained for informational and literary texts according to an embodiment. Distributions for informational texts (n=171) are plotted with a solid line; distributions for literary texts (n=203) are plotted with a dashed line.
Figure 3B:
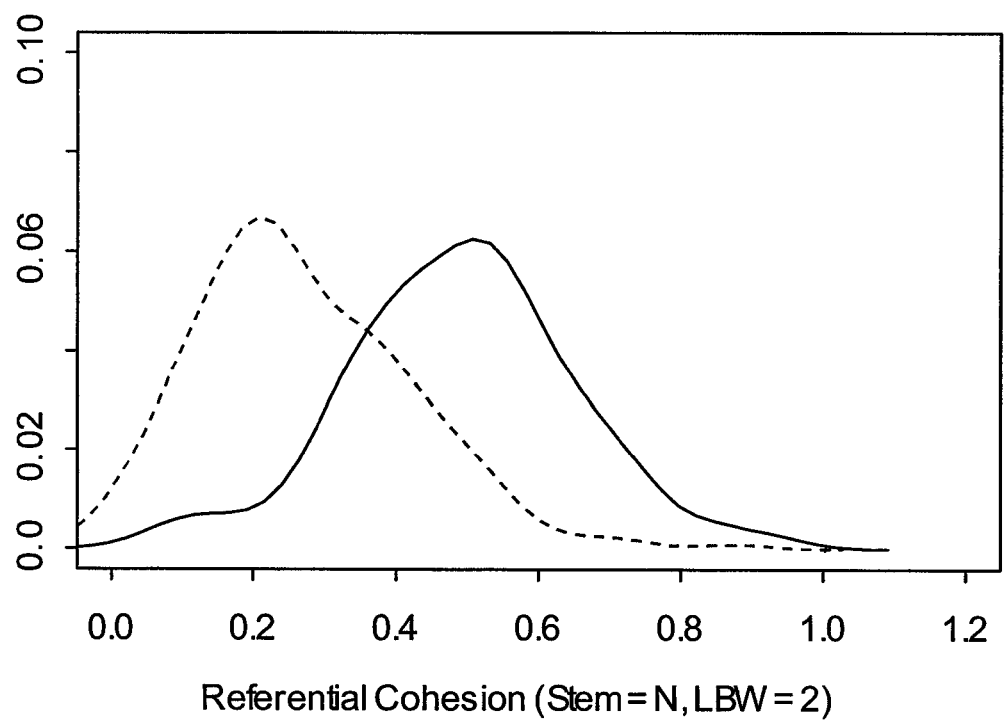
Figure 3C:
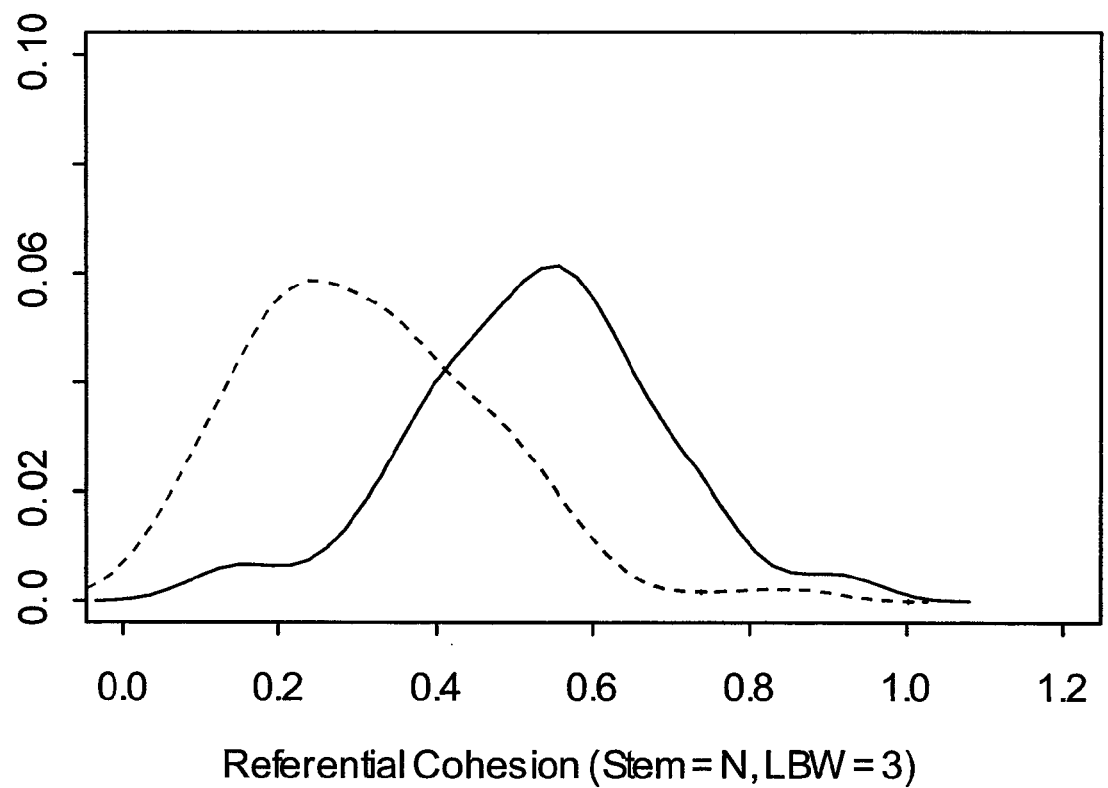
Figure 3D:
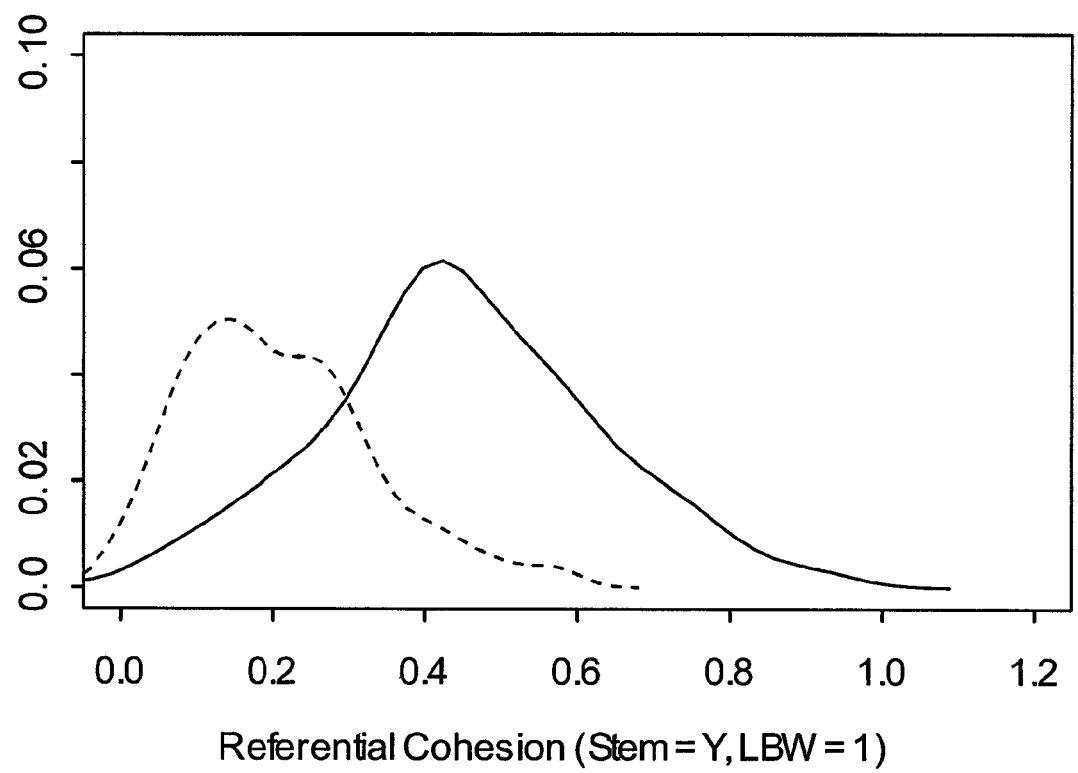
Figure 3E:
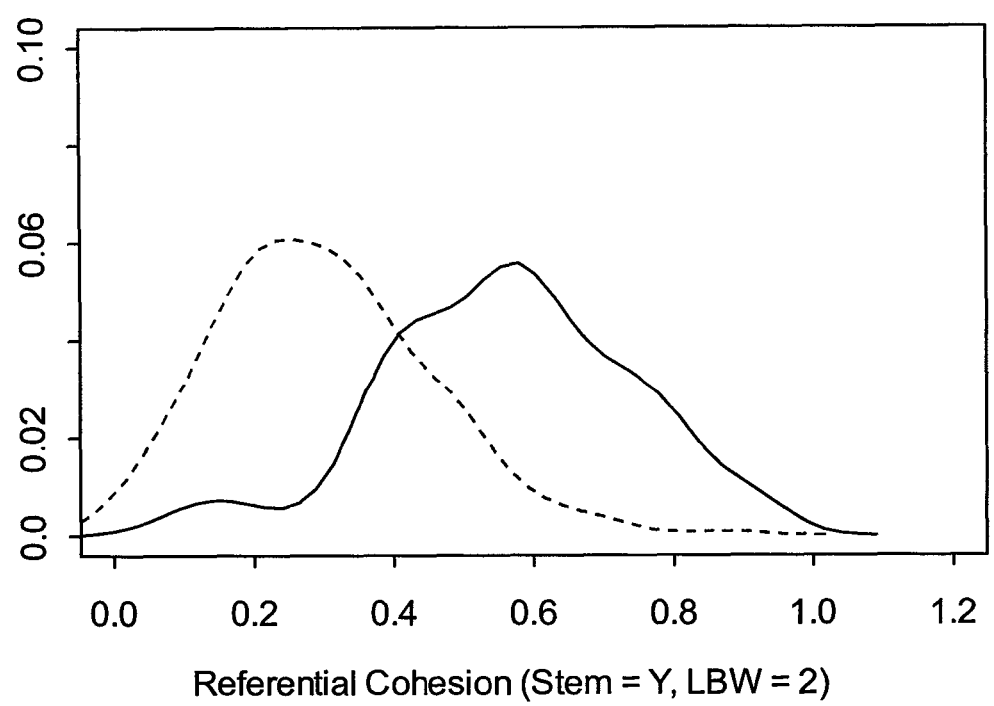
Figure 3F:
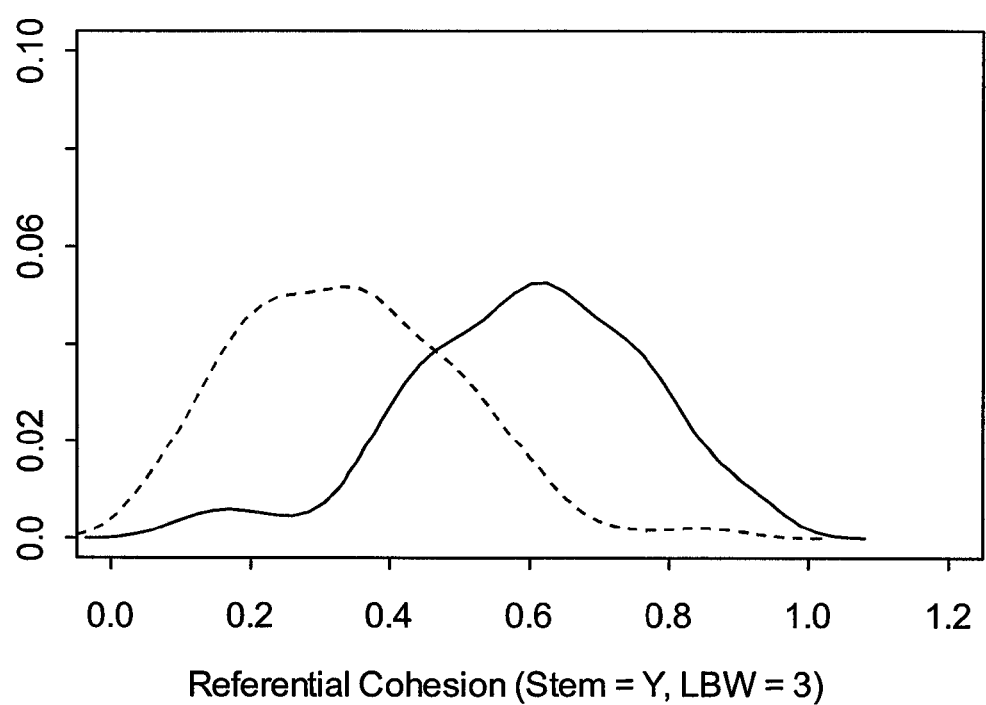
Figure 4A:
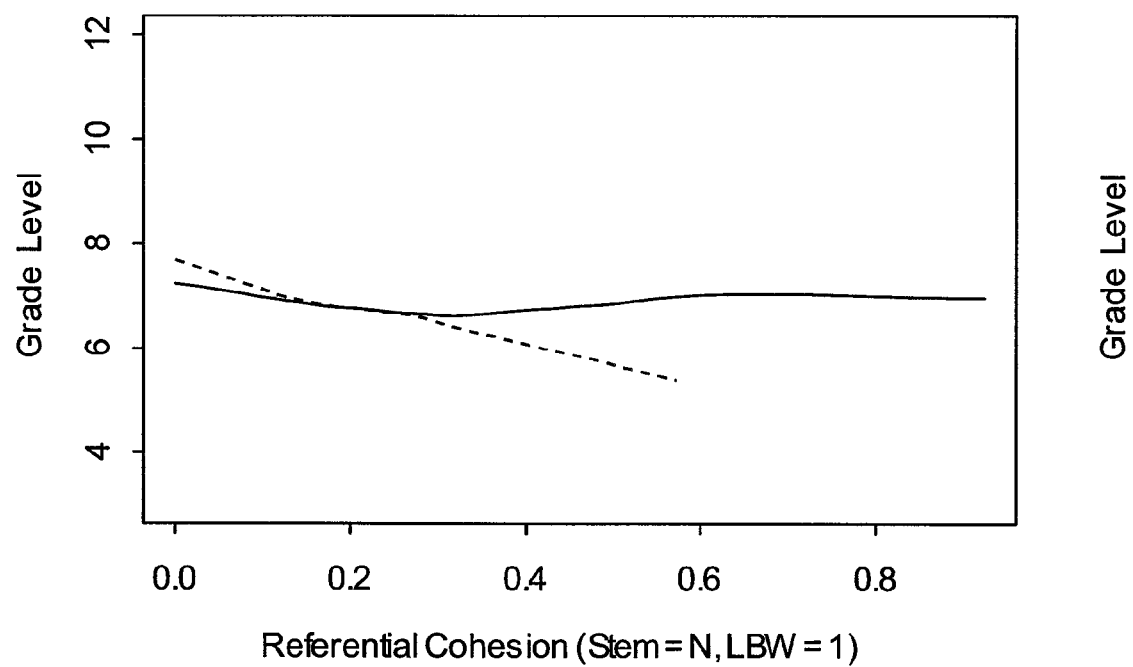
FIGS. 4A-4F are graphs that depict trends in grade level variation plotted conditional on referential cohesion, according to an embodiment. Trends for informational texts (n=171) are plotted with a solid line; trends for literary texts (n=203) are plotted with a dashed line.
Figure 4B:
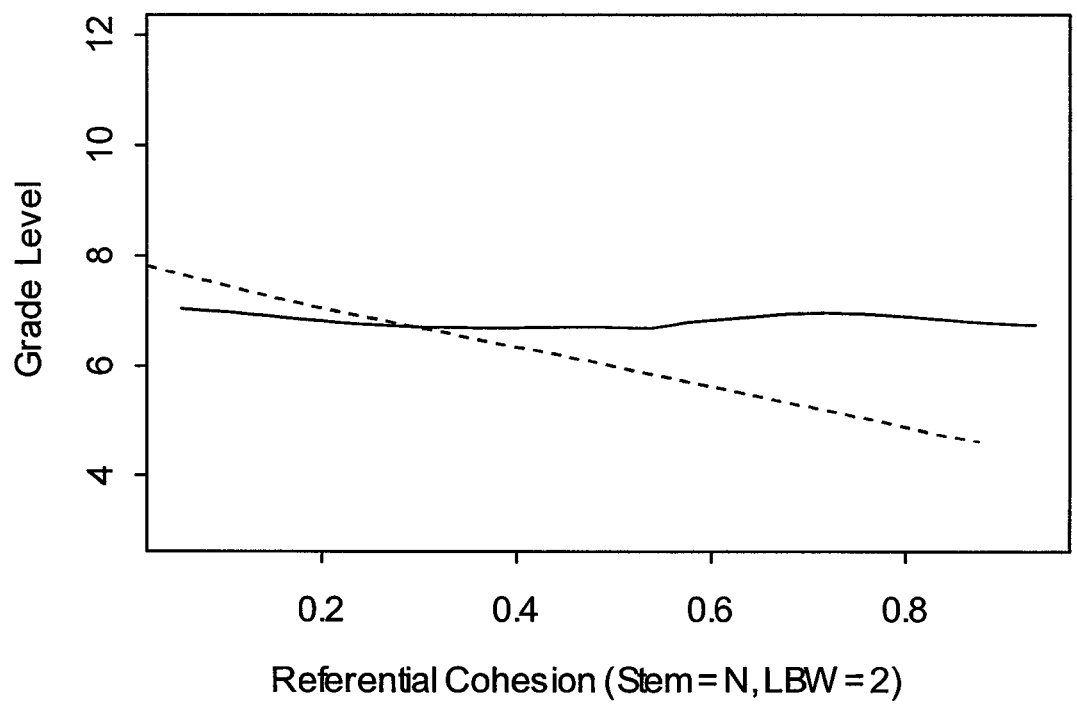
Figure 4C:
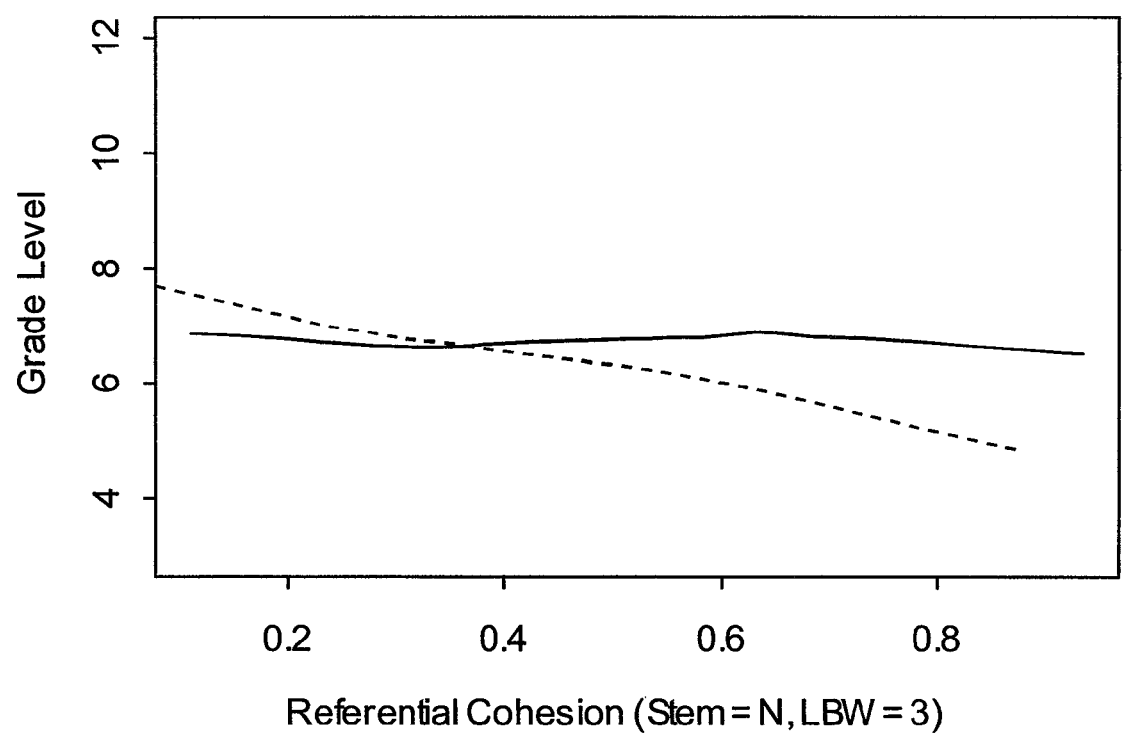
Figure 4D:
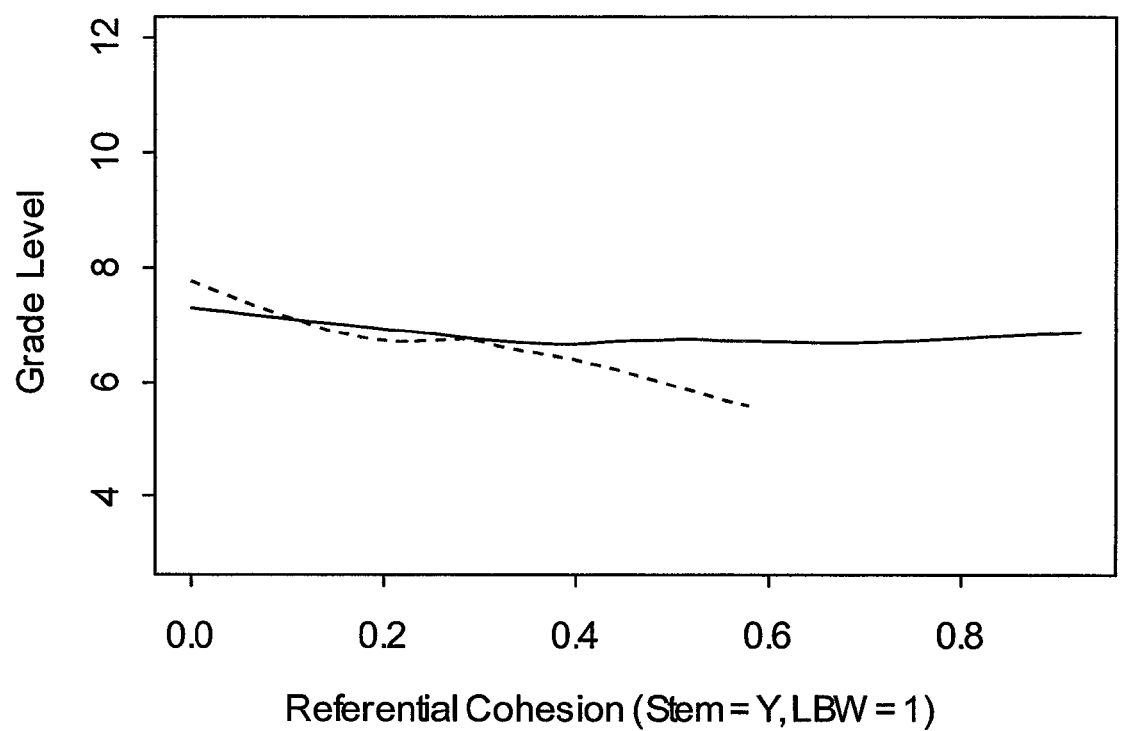
Figure 4E:
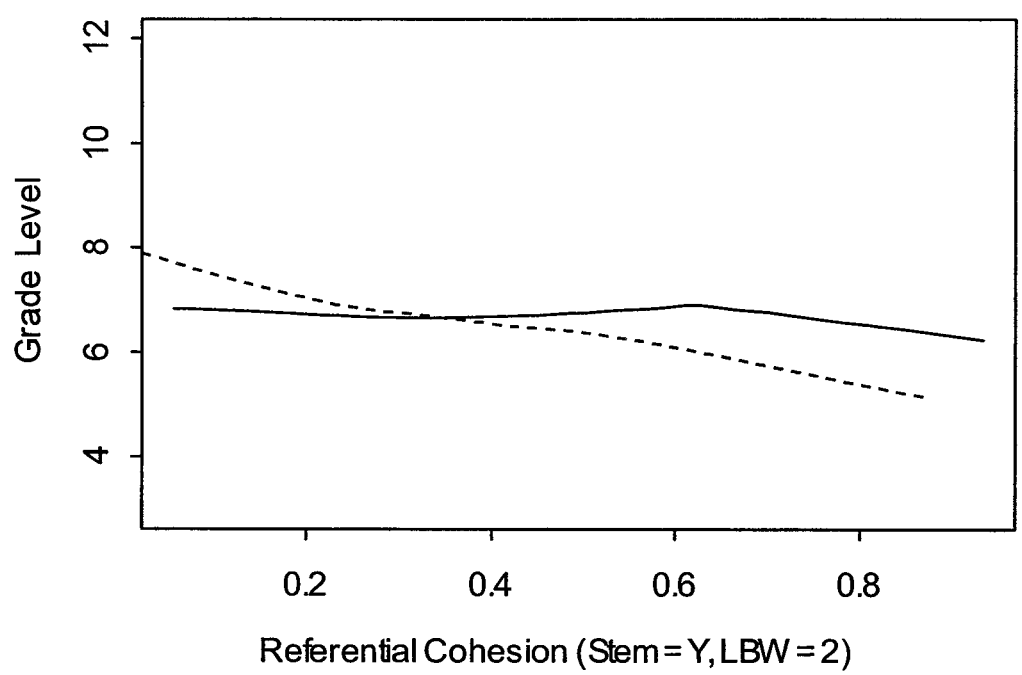
Figure 4F:
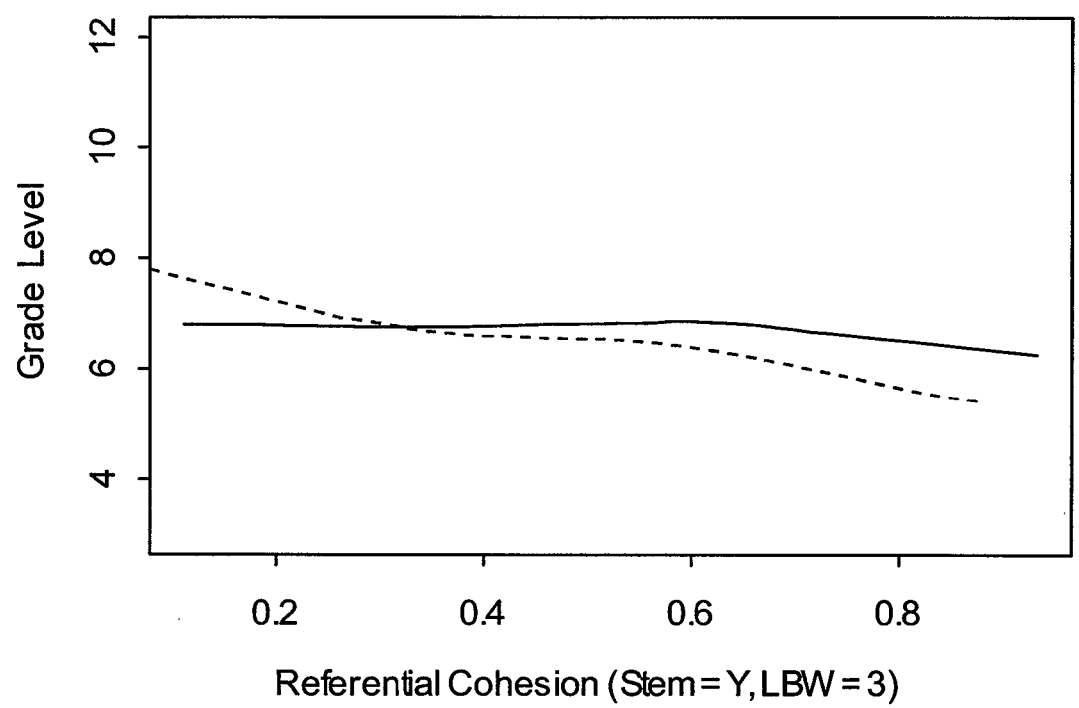

FIG. 2 provides a graphical display designed to illuminate these results. The display depicts changes in text GL plotted conditional on average word frequency, as determined from the Lexile Word Frequency Index. In order to highlight differences in the results obtained for informational and literary texts, a LOWESS scatter plot smoother has been applied to the data (Cleveland, 1979). Results for informational texts are plotted with a solid line; results for literary texts are plotted with a dashed line. Note that the literary curve appears above the informational curve throughout the entire observed range of the data. This confirms that a given value of the Average Lexile Word Frequency feature is indicative of a higher average GL score if the text in question is a literary text and a lower average GL score if the text in question is an informational text. Since a model that includes this feature without also accounting for genre differences will tend to yield predictions that fall between the two curves, resulting GL predictions will tend to be too high for informational texts (positive bias) and too low for literary texts (negative bias). Although not shown here, similar plots prepared for each of the other two vocabulary features and the average sentence length feature yielded similar trends.

As is indicated in Table 2, a somewhat different set of results was obtained for the six measures of referential cohesion. The plots in FIGS. 3A through 3F (one for each measure) can help us to understand these results. Each plot shows two distributions: the distribution of referential cohesion values obtained for the subset of 171 informational passages and the distribution of referential cohesion values obtained for the subset of 203 literary passages. The resulting displays show that, for all six measures, the informational distribution is shifted to the right relative to the literary distribution. Since both sets of texts are targeted at the same population of readers (i.e., students in grades 3 through 12) this suggests that GL effects may not be sufficient to explain all of the observed cohesion differences in these two sets of texts. McCarthy et al. (2006) reported a similar finding for the informational and literary texts in the TASA corpus. Thus, in both the ETS Corpus and the TASA Corpus, the average referential cohesion level of informational texts exceeds that of literary texts even though both sets of texts are targeted at the same population of readers. In interpreting these results McCarthy et al. (2006) suggested that authors may elect to include higher levels of referential cohesion in informational texts in order to compensate for readers' presumed lack of familiarity with the subject matter. But is this strategy effective? To help answer that question, FIGS. 4A through 4F show genre-specific LOWESS smooths of text GL plotted conditional on degree of referential cohesion as measured by each of our six features. As in the previous set of plots, results for informational texts are plotted with a solid line and results for literary texts are plotted with a dashed line. Note that vastly differing trends are shown for each text type. In particular, when only literary texts are considered, increases in referential cohesion are associated with linear decreases in average GL, a result that is consistent with earlier findings reported in Crossley, et al. (2007). When only informational texts are considered, however, a sharply different trend is evident: i.e., informational texts with high levels of referential cohesion do not tend to be classified at lower GLs compared to informational texts with lower levels of referential cohesion. These results can help us anticipate the errors expected when text difficulty models include measures of referential cohesion without accounting for genre effects. In particular, since a model that does not account for genre effects will tend to yield predictions that fall between the two curves, informational texts with high levels of referential cohesion will tend to receive GL predictions that are too low (negative bias) and literary texts with high levels of referential cohesion will tend to receive GL predictions that are too high (positive bias).

In interpreting these trends it is useful to recall that the approaches for measuring referential cohesion considered here do not correct for the fact that, as sentence length increases, the probability of finding a matching content word in a previous sentence also increases. Table 3 presents a correlation analysis designed to illustrate these effects. The table shows the correlation between text GL and referential cohesion level before and after controlling for variation due to differences in log average sentence length. Several interesting trends are shown. First, for both informational and literary texts, the strategy of partialling out variation due to differences in log average sentence length serves to increase the correlation suggesting that it may be the case that effects due to variation in referential cohesion are most accurately interpreted when sentence length variation has also been assessed. Second, for both informational and literary texts, and for all three window lengths, stemming appears to have boosted the correlation with text GL. This suggests that the extra effort involved in creating referential cohesion measures that account for overlapping word stems, in addition to overlapping word tokens, may be worthwhile. Table 3 also shows the effect of adjusting the size of the look-back window for both informational and literary texts. Note that, when only informational texts are considered, the partial correlation with text GL decreases as the size of the look-back window is increased, but when only literary texts are considered, the trend runs in the opposite direction, i.e., for literary texts the partial correlation with text GL increases as the size of the look-back window is increased. This interaction suggests that distinct referential cohesion features may be needed to properly account for the referential cohesion effects present in informational and literary texts. The need for distinct measurement approaches is also evident when we compare the magnitude of the correlations. That is, even if we select a 1-sentence LBW (Look Back Window) for informational texts, and a 3-sentence LBW for literary texts, the resulting measures of referential cohesion still account for a larger proportion of the observed GL variation among literary texts than among informational texts. The statistical significance of this result was evaluated using Cohen's Test for the Difference Between Two Correlations (see Cohen, Cohen, West, & Aiken, 2003, p. 49). This approach employs Fischer's Z' transformation to account for the fact that the sampling distribution of r is likely to be asymmetrical (see Snedecor & Cochran, 1973, p. 183). The test was implemented by comparing the best informational correlation, i.e., $r=-0.202$ (Stemming=Yes & LBW=1) to the best literary correlation, i.e., $r=-0.459$ (Stemming=Yes & LBW=3), yielding $Z'=2.45$ which was highly significant ($p<0.05$.) This result further supports our assertion that prediction models that do not account for variation due to differences in text genre are in danger of providing misleading information about the aspects of text variation that may cause texts to be more or less difficult for struggling readers.

TABLE 3

Correlation Between Text Grade Level and Referential Cohesion for Six Different Cohesion Measures, Before and After Controlling for Variation Due to Differences in Log Average Sentence Length, By Type of Text

| | Informational Texts | | Literary Texts | |
| --- | --- | --- | --- | --- |
| Measure | r | Partial r | r | Partial r |
| Stemming = No | | | | |
| LBW = 1 | .002 | −.164** | −.150** | −.365*** |
| LBW = 2 | −.009 | −.150* | −.183*** | −.416*** |
| LBW = 3 | −.013 | −.141* | −.177** | −.438*** |
| Stemming = Yes | | | | |
| LBW = 1 | −.023 | −.202*** | −.126* | −.388*** |
| LBW = 2 | −.031 | −.195** | −.144** | −.421*** |
| LBW = 3 | −.044 | −.185** | −.152** | −.459*** |

Note.
LBW = Look Back Window (in sentences).
*$p < .10$,
**$p < .05$,
***$p < .01$.

Figure 5A:
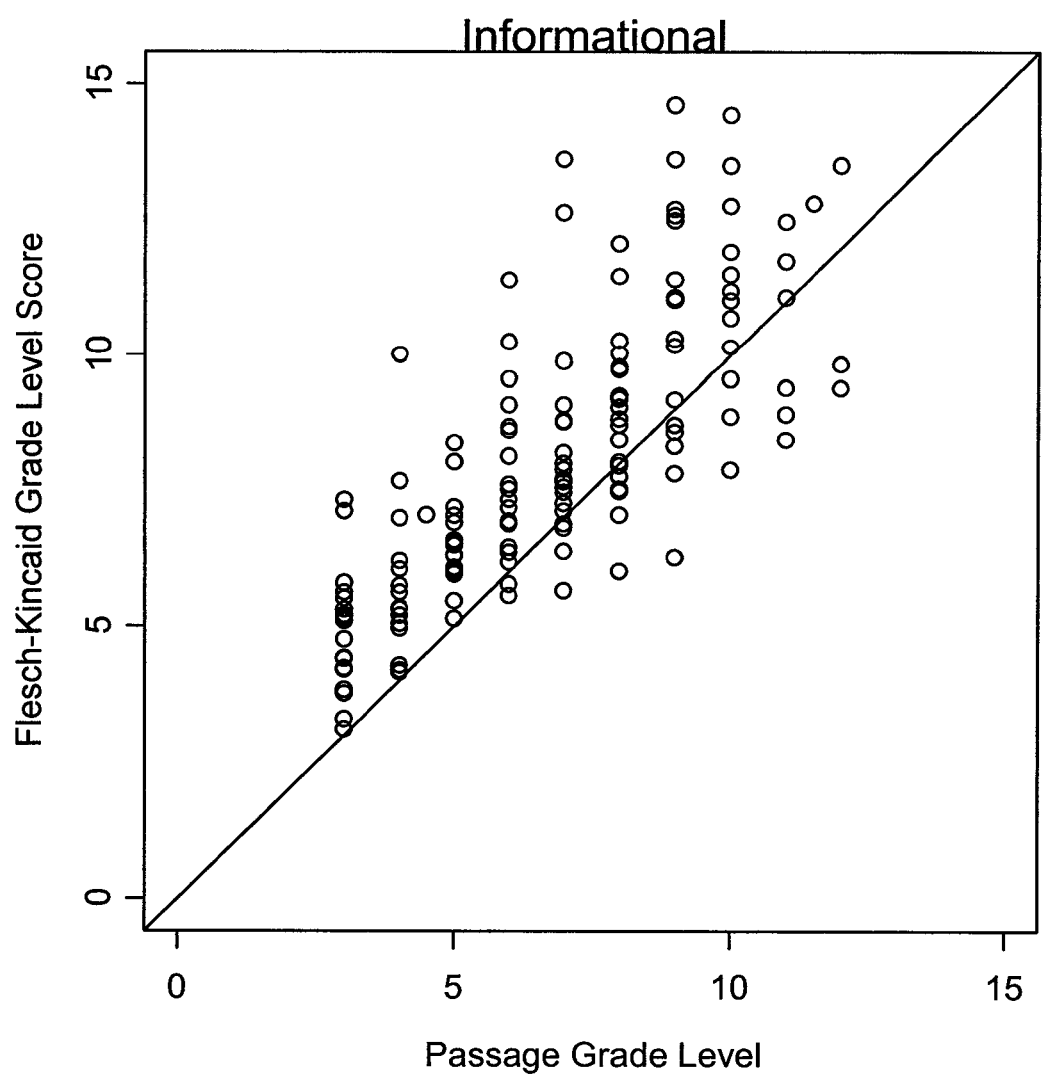
FIGS. 5A and 5B are graphs that depict grade level predictions generated via the Flesch-Kincaid Grade Level Score compared to grade level classifications developed from high stakes accountability assessments targeted at students in grades 3 through 12, for informational texts (n=171) and literary texts (n=203), according to an embodiment.
Figure 5B:
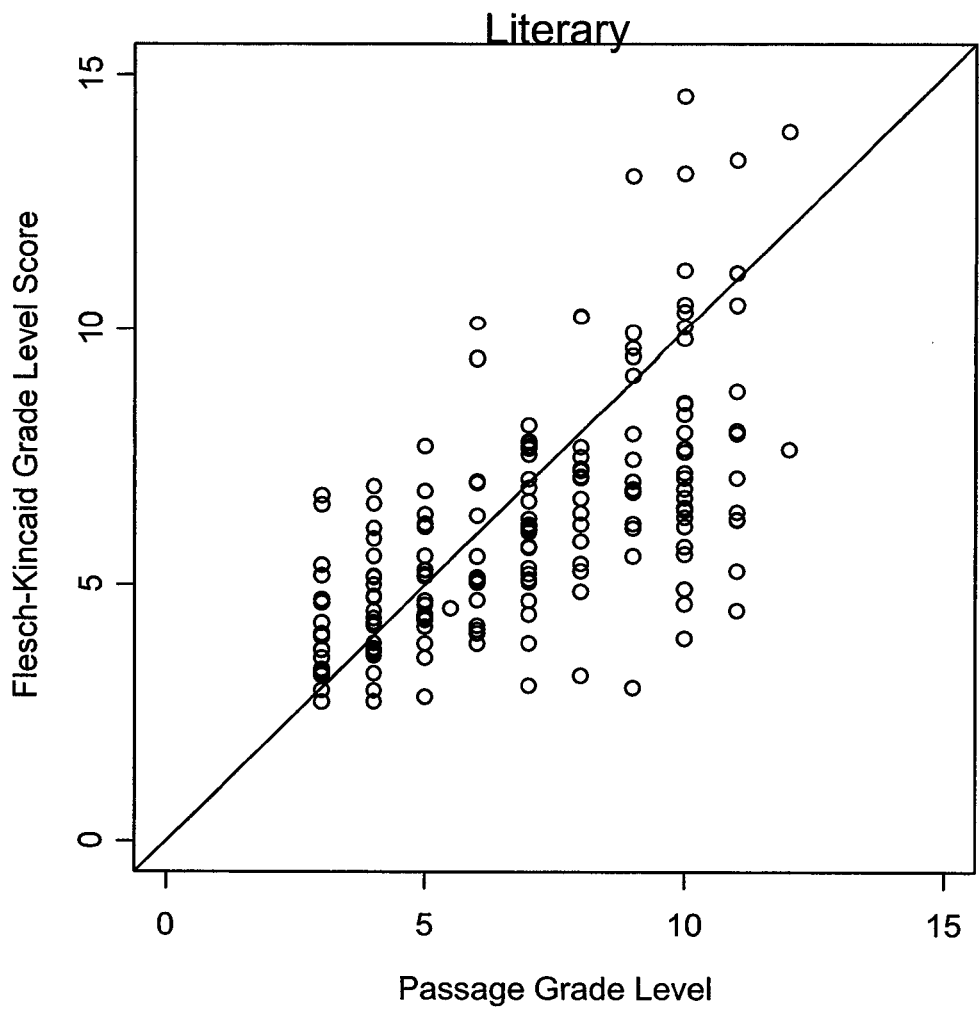

The results summarized above can also help us predict the biases expected for models containing certain combinations of features. Two particular cases are of interest: (1) models composed of individual features that are all biased in the same direction, and (2) models containing subsets of features that are biased in opposite directions. The Flesch-Kincaid GL Score is an example of the first type of model since, as was previously demonstrated in Table 2, each of its two features, i.e., average word length in syllables and average sentence length in words, is positively biased for informational texts and negatively biased for literary texts. Note that this suggests that the Flesch-Kincaid GL Score will tend to overpredict the difficulty of informational texts, while simultaneously under-predicting the difficulty of literary texts. The scatter plots in FIGS. 5A and 5B confirm that this prediction is correct. FIG. 5A evaluates Flesch-Kincaid estimates of text difficulty for informational texts (n=171); FIG. 5B evaluates Flesch-Kincaid estimates of text difficulty for literary texts (n=203). The comparison confirms that, as predicted, the Flesch-Kincaid GL Score tends to overpredict the difficulty of informational texts while simultaneously underpredicting the difficulty of literary texts. [Note: The average magnitude of the prediction errors in these two text collections was as follows: +1.40 GLs for informational texts and −0.65 GLs for literary texts.]

It is also useful to consider the biases expected when prediction models include multiple features defined such that different subsets of features are biased in opposite directions. The feature coefficients obtained for four such models are shown in Table 4. Each model is designed to predict variation in text GL from a combination of three features: a measure of syntactic complexity, a measure of referential cohesion and a measure of semantic difficulty. In each model, syntactic complexity is measured via the average sentence length feature and semantic difficulty is measured via an average word frequency feature. In Models 1 and 2, average word frequency is assessed via the Lexile Word Frequency Index. In Models 3 and 4, average word frequency is assessed via the TASA Word Frequency Index. The models also incorporate two different approaches for measuring degree of referential cohesion. In Models 1 and 3, referential cohesion is assessed via an overlap statistic calculated with Stemming=No and Look Back Window=3. In Models 2 and 4, referential cohesion is assessed via an overlap statistic calculated with Stemming=Yes and Look Back Window=3.

Each model was estimated three times, once using informational texts only, once using literary texts only, and once using a Mixed Corpus composed of both informational and literary texts. For each feature in each model, the coefficients estimated from the genre-segregated corpora provide an estimate of the "true" effect of the feature, i.e., the effect expected when interactions with text genre are properly accounted for. By contrast, the coefficients estimated from the Mixed Corpus illustrate the effects expected when interactions with text genre are not properly accounted for.

TABLE 4

Feature Coefficients Estimated from Three Different Types of Corpora (Informational, Literary and Mixed) for Four Models Designed to Predict Variation in Text Grade Level

| | Feature Coefficients | | |
|---|---|---|---|
| Feature | Informational Texts (n = 171) | Literary Texts (n = 203) | Mixed (n = 374) |
| Model 1 | | | |
| Avg. Sentence Length | 12.4682*** | 11.4394*** | 11.8325*** |
| AWF (Lexile) | −0.4093*** | −0.3308*** | −0.3301*** |
| Cohesion (Stem = N, LBW = 3) | −2.5351** | −5.5683*** | −4.9078*** |
| Model 2 | | | |
| Avg. Sentence Length | 12.3736*** | 11.8979*** | 11.8981*** |
| AWF (Lexile) | −0.4351*** | −0.3371*** | −0.3683*** |
| Cohesion (Stem = Y, LBW = 3) | −3.1225** | −5.9114*** | −5.0348*** |
| Model 3 | | | |
| Avg. Sentence Length | 12.1509*** | 12.5625*** | 12.2266*** |
| AWF (TASA) | −0.5337*** | −0.3690*** | −0.4551*** |
| Cohesion (Stem = N, LBW = 3) | −1.3782 | −5.6518*** | −3.8034*** |
| Model 4 | | | |
| Avg. Sentence Length | 12.3081*** | 13.0560*** | 12.4509*** |
| AWF (TASA) | −0.5320*** | −0.3658*** | −0.4611*** |
| Cohesion (Stem = Y, LBW = 3) | −1.8216* | −5.9303*** | −3.7226*** |

Note.
Mixed = a mixed corpus containing both informational and literary texts.
AWF = Average Word Frequency.
LBW = Look Back window (in sentences).
***$p < .001$,
**$p < .01$,
*$p < .05$ Consider the coefficients listed for the Referential Cohesion features. These suggest that, when genre/feature interactions are ignored, effects due to differences in referential cohesion will either be underpredicted or overpredicted depending on whether the text in question is an informational text or a literary text. This can be seen by comparing the cohesion coefficients estimated from the Mixed Corpus, to those estimated from the genre-segregated corpora. The comparison shows that, when genre effects are properly accounted for, cohesion effects are much smaller among informational texts (i.e., −2.5351, −3.1225 or −1.3782 or −1.8216 depending on the particular model considered) and much larger among literary texts (i.e., −5.5683, −5.9114, −5.6518 or −5.9304 depending on the particular model considered.) When genre effects are not properly accounted for, however, an average effect is estimated. Note that the average effect tends to overstate the "true" cohesion effect for informational texts while simultaneously under-stating the "true" cohesion effect for literary texts.

The results in Table 4 also suggest an opposite pattern of over- and under-prediction for the average sentence length feature and the two word frequency features. To see this, note that, for all three features, coefficients estimated from the Mixed Corpus are slightly too low for informational texts and slightly too high for literary texts, as compared to the "true" coefficients estimated from the genre segregated corpora. This confirms that many important text features interact strongly with genre, and that prediction models that fail to account for these interactions run the risk of yielding inaccurate feedback about the particular text features that may cause texts to be more or less difficult for struggling readers.

As will be demonstrated below (in Step 4) SourceFinder accounts for the genre effects described above by providing two distinct difficulty models: one optimized for application to informational texts, and one optimized for application to literary texts.

Step 3: Feature Extraction and Estimation of Dimension Scores

SourceFinder's feature set currently includes more than 100 different features. Many (but not all) of these features were previously described in Sheehan et al. (2006) and in Sheehan, et al. (2007a, 2007b). Three different types of features are included:
(1) features designed to assess variation due to the classic readability dimensions of syntactic complexity and semantic difficulty;
(2) features designed to assess variation due to differences in text cohesion; and
(3) features designed to assess variation due to differences in text genre, style, and processing complexity.

These three groups of features are described below.

Syntactic Complexity and Semantic Difficulty

SourceFinder's current feature set includes several features designed to capture variation due to the classic readability dimensions of syntactic complexity and semantic difficulty. These include:
(a) three measures of syntactic complexity (average sentence length, average clause length and the average frequency of prepositions);
(b) two measures of word length (average word length in syllables and average word length in characters);
(c) one measure of word familiarity (frequency of words from the Dale list of 3,000 familiar words);
(d) two measures of word frequency, one determined from the TASA Word Frequency Index (Zeno, et al, 1995), and one determined from a second word frequency index developed from the Lexile Corpus; [Note: the Lexile Word Frequency Index was developed from a version of the Lexile Corpus provided by the Metametrics Corporation. Since the entire Lexile Corpus was not provided, the resulting index is similar, but not identical to, the word frequency index used in the Lexile Framework], and
(e) four measures of the frequency of rare words: the frequency of word tokens with TASA scores below 30, the frequency of word tokens with TASA scores below 40, the frequency of word types with TASA scores below 30, and the frequency of word types with TASA scores below 40. [The terms "token" and "type" are frequently used when referring to different types of word counts. The term "token" is used when all instances of a targeted category are counted. The term "type" is used when only unique instances are counted. For example, the sentence "I drank a glass of water and a glass of juice," includes 11 word tokens but only eight word types since the words a, of and glass are repeated.]

Cohesion

SourceFinder's current feature set also includes several features designed to assess variation due to differences in text cohesion. Many of these are based on previous research documented in Graesser et al. (2004) and McNamara et al. (2006). For example, the following types of sentence connectives are included: causal connectives, clarification conjuncts, adversative conjuncts, conditional subordinators, concessive subordinators, and multi-function subordinators. The six measures of referential cohesion discussed above are also included. Like the measures described in McNamara et al. (2006), each referential cohesion measure provides an estimate of the average number of sentences classified as exhibiting noun overlap with preceding sentences. The measures differ in terms of whether stemming is included (Yes or No), and whether overlap detection considers one, two or three preceding sentences (Look Back Window=1, 2 or 3). A measure of thematic continuity, i.e., the ratio of definite to indefinite determiners, is also included.

Text Genre, Style, and Processing Complexity

SourceFinder's current feature set also includes several features designed to assess variation due to differences in text genre, style, and processing complexity. Many of these are based on previous research documented in Biber (1986, 1988), Biber, Johansson, Leech, Conrad, & Finegan (1999, pp. 322-325, 365-378, 461) and Biber et al. (2004). For example, usage rates are included for three different types of verbs: (1) verbs that tend to occur with higher frequency in academic texts than in non-academic texts, e.g., apply, develop, indicate; (2) verbs that tend to occur with higher frequency in fiction than in nonfiction, e.g., feel, leave, speak; and (3) verbs that tend to occur with higher frequency in transcripts of conversations than in printed texts, e.g., put, want.

A number of features designed to assess adherence to a less formal, more conversational style are also included. These were based on a number of previous studies including Flesch, (1948); Beck, et al., (1995); and Moreno & Mayer (2000). The resulting subset includes features such as the frequency of first and second person pronouns, the frequency of question marks, and the ratio of nouns to verbs.

A number of features designed to assess adherence to a more formal, more academic style are also included. For example, one feature measures the frequency of words from Coxhead's list of words found frequently in Academic texts (Lists 1 and 2, Coxhead, 2000), and a second feature measures the average concreteness level of a text, as determined from a database of concreteness ratings provided by human raters (Coltheart, 1981).

Several measures of the degree of negation detected in a text were also included. The importance of measuring effects due to variation in the degree of negation detected in a text is supported by research documenting longer processing times for texts containing negation compared to texts that do not contain negation (Carpenter & Just, 1975).

Feature Extraction Procedures

SourceFinder's feature extraction routines can be summarized as follows. First, a sentence segmenter is applied to each text. Next, a part of speech (POS) tagger is applied, followed by a syntactic parser. Count-based features are then extracted. Note that this approach ensures that all features that are specific to a particular POS, e.g., the three verb features discussed above, consider only those instances that conform to the targeted POS. In the final step of the extraction process, all count-based features are re-expressed on a log frequency per 1,000 words scale.

Estimation of Dimension Scores that Account for Feature Intercorrelations

A key innovation of the SourceFinder approach is its use of dimension scores that account for the strong intercorrelations that are likely to exist among relevant text features. SourceFinder's dimension scores are estimated as linear combinations of correlated text features defined via a corpus-based analysis similar to that described in Biber (1986, 1988) and Biber et al. (2004). Our implementation differs from the previous implementations cited above in the following ways. First, while all of Biber's previous investigations considered variation in both written and spoken texts, we elected to restrict our attention to written texts only. This difference was designed to ensure that the resulting dimension scores would be optimally configured to characterize variation in written language as opposed to variation that spans both written language and spoken language. However, the present invention is not limited to use with only written language, i.e. the specified techniques could also be used to analyze difficulty variation among transcripts of spoken language. Second, although Biber (1986, 1988) and Biber et al. (2004) used a principal factor analysis to analyze their feature sets, we elected to employ a principal components analysis instead. Third, because our corpus was not annotated (see below) the dimension identification approach discussed in Biber (1986, 1988), Reppen (2001) and Louwerse, et al. (2004) could not be implemented. That is, in each of the previous analyses referenced above, individual texts were classified as belonging to particular registers and genres, e.g., mystery fiction, science fiction, academic prose, official documents, etc. Because such annotations were not available for the texts in our corpus, dimension identification was accomplished via a "marker variable" approach. Marker variables are variables that can be reasonably expected to provide relatively pure measurement of specific targeted dimensions (Tabachnick and Fidell, 2001, p. 587). Since many of the features considered in the analyses had been previously shown to provide relatively pure measurement of several of our targeted constructs, these variables were used to interpret the resulting dimensions.

The analysis was implemented on a subset of texts selected from the Lexile Corpus, a collection of informational and literary texts targeted at students in grades kindergarten through college. The selected subset included the first 1000 words of all texts with Lexile scores between 520 and 1300, a subset that roughly corresponds to the targeted grade range. The resulting corpus included more than 12 million words of running text distributed across a total of 12,476 documents.

The first phase of the analysis considered nearly 100 features, including all of the features discussed above except for the six features designed to measure variation due to differences in referential cohesion and two features that required accurate paragraph segmentation markers. Referential cohesion features were excluded because the needed feature extraction routines were not available at the time that the feature extraction was performed. Features requiring accurate paragraph segmentation markers were excluded because the version of the Lexile Corpus provided to us by the Metametrics Corporation did not include accurate paragraph markers.

The analysis indicated that many of the original features were either redundant, or were only weakly correlated with the major dimensions of variation underlying the bulk of the features. Consequently, the feature set was further reduced to a subset of 48 prime features. A principal components analysis of the 48 retained features suggested that, at most, eight dimensions of variation were being measured. Since all eight components appeared to be construct relevant, an eight-component solution was extracted. Taken together, these eight components accounted for more than 60% of the shared variance.

The specific aspects of text variation addressed by these eight dimensions were determined by considering the loadings obtained for the available marker variables. Results for each dimension are summarized in Table 5 below. The table shows the actual loadings obtained for each feature as well as their "Marker Status." The codes in the "Marker Status" column show which features were included in each of five previous corpus-based analyses, abbreviated as follows: B86=Biber (1986), B88=Biber (1988), B99=Biber, et al., (1999), B04=Biber, et al. (2004), and R01=Reppen (2001). Numbers in parentheses refer to specific previously identified dimensions. Thus, B86(1) indicates that the referenced feature had a high loading on the first dimension reported in Biber (1986). Because Biber et al., (1999) did not include a factor analysis, factor numbers are not provided for the B99 code. Instead, the B99 codes indicate whether the references feature was found to be indicative of conversation (C), academic text (A), or fiction (F).

Table 5 also provides a short descriptive label for each dimension. These were developed by considering the pattern of variation implied by the available marker variables, and by the other highly weighted features within the dimension, as summarized below.

TABLE 5

Major Dimensions of Text Variation with Sample Features, Loadings and Marker Variable Status.

| Feature | Loading | Marker Status |
| --- | --- | --- |
| Dimension 1: Spoken vs. Written Language | | |
| First Person Singular Pronouns [I, me, my, etc.] | +.99 | B86(1), B88(1), B04(1) |
| First Person Plural Pronouns [we, us, our, etc.] | +.98 | B86(1), B88(1), B04(1) |
| Communication Verbs [ask, call, question, etc.] | +.74 | B04(1) |
| Wh words [who, what, where, etc.] | +.67 | B86(1), B88(1), B04(1) |
| Average Lexile Word Frequency | +.66 | |
| Conversation Verbs [put, want, etc.] | +.60 | B99(C) |
| Question Marks (frequency per 100 sentences) | +.57 | B86(1), B88(1), B04(1) |
| Contractions [didn't, can't, I've, etc.] | +.55 | B86(1), B88(1), B04(1) |
| Mental State Verbs [appreciate, care, feel, etc.] | +.54 | B04(1) |
| Second Person Pronouns [you, your, yours, etc.] | +.53 | B86(1), B88(1), B04(1) |
| Ratio of Nouns to Verbs | −.47 | |
| Attributive Adjectives | −.47 | B88(1), B04(1) |
| Non-proper Nouns | −.81 | B88(1), B04(1) |
| Dimension 2: Academic Style | | |
| Nominalizations [-tion, -ment, -ness, -ity] | +.90 | B86(2), B99(A) |
| Average Syllables per Word (log syllables) | +.87 | |
| Academic Words (Coxhead) | +.82 | |
| Abstract Nouns [existence, progress, etc.] | +.77 | |
| Topical Adjectives [political, physical, etc.] | +.70 | |
| Cognitive Process/Perception Nouns [concept, etc.] | +.65 | |
| Academic Verbs [apply, develop, indicate, etc.] | +.64 | B99(A) |
| Average Characters per word (log characters) | +.61 | B86(2) |
| Clarification Conjuncts [for example, namely, etc.] | +.44 | |
| Passive Constructions | +.34 | B86(2) |
| Frequency of Words from the Dale/Chall List | −.59 | |
| Average Concreteness Rating [From the MRC db] | −.77 | |

TABLE 5-continued

Major Dimensions of Text Variation with Sample Features,
Loadings and Marker Variable Status.

| Feature | Loading | Marker Status |
| --- | --- | --- |
| Dimension 3: Narrative Style | | |
| Past Tense Verbs | +.79 | B86(3), B88(2), B04(3), R01(2) |
| Past Perfect Aspect Verbs | +.78 | B86(3), B88(2), B99(F) |
| Third Person Singular Pronouns [he, she, etc.] | +.62 | B86(3), B88(2), B04(3) |
| Present Tense Verbs | −.87 | B86(3), R01(2) |
| Dimension 4: Sentence Complexity | | |
| Average No. of Words per Clause (log words) | +.92 | |
| Average No of Words per Sentence (log words) | +.89 | |
| Prepositions | +.54 | |
| Dimension 5: Vocabulary Difficulty | | |
| TASA SFI <30 (Token Count) | +.89 | |
| TASA SFI <30 (Type Count) | +.83 | |
| Average TASA SFI | −.67 | |
| Dimension 6: Overt Expression of Persuasion | | |
| To Infinitives | +.76 | B88(4) |
| Necessity Modals [should, must, etc.] | +.60 | B88(4) |
| Possibility Modals [can, can't, could, etc.] | +.56 | B88(4), R01(5) |
| Conditional Subordinators [if, unless] | +.55 | B88(4), R01(5) |
| Predictive Modals [will, would, etc.] | +.41 | B88(4) |
| Dimension 7: Negation | | |
| Synthetic Negation [no, neither, nor] | +.80 | |
| Adversative Conjuncts [alternatively, etc] | +.39 | |
| Negative Adverbs [never, seldom, rarely, etc.] | +.38 | |
| Dimension 8: Subordination | | |
| Concessive subordinators [though, although] | +.59 | |
| Causal Subordinators [because] | +.58 | |
| Multi-function Subordinators [so that, etc.] | +.42 | |

Note.
Numbers in parentheses indicate particular factor numbers, as reported in previous research. The letters C, A and F in parentheses indicate that the referenced feature was found to be indicative of Conversation, Academic Text or Fiction respectively.

Dimension #1: Spoken vs. Written Language

Table 5 shows that almost all of the features with high loadings for this dimension also had high loadings on the first dimensions reported in one or more of the following studies: Biber (1986), Biber (1988), and Biber et al. (2004). Since, in each of these previous studies, the referenced construct was characterized as measuring differences between spoken and written language, these results suggest that the first dimension obtained in the current analysis may be viewed as a measure of the extent to which a written text exhibits linguistic structures that are more characteristic of spoken language than of written language. This interpretation is further supported by noting that many of the features with high loadings on this dimension are indicative of a more spontaneous, more conversational style as opposed to a less spontaneous, print-only style. These include first- and second-person pronouns, communication verbs, words indicative of questions, question marks, and verbs that tend to occur more frequently in conversation than in printed text. The table also shows three features with relatively high negative loadings, i.e., the ratio of nouns to verbs, the frequency of attributive adjectives and the frequency of non-proper nouns. These findings are consistent with a finding reported in Zechner (2001, pp. 23-27) that transcripts of informal conversations generally exhibit lower ratios of nouns to verbs as compared to transcripts of more formal speech such as news broadcasts, the latter being more similar to written text. Consequently, this dimension is labeled the Spoken vs. Written Language Dimension.

Dimension #2: Academic Style.

Table 5 shows that three of the features with high loadings for this dimension also had high loadings on the second dimension reported in Biber (1986). These three features are Nominalizations, Average Characters per Word and Passive Constructions. Biber (1986) reported that samples of academic prose tended to score highly on a dimension that loaded heavily on these three features, thereby supporting the notion that the second dimension extracted in the current analysis may be interpreted as a measure of the degree of academic orientation detected in a text. As is shown in Table 5, this interpretation is also supported by two findings from Biber, et al. (1999). Biber et al. (1999, pp. 322-325, 365-378) compared the frequency of occurrence of certain linguistic features in academic texts, transcripts of conversations, and fiction. He reported that both nominalizations and academic verbs (e.g., apply, develop, indicate, etc.) tended to occur more frequently in academic texts than in transcripts of conversations or in fiction. Thus, these latter results also support the notion that scores on Dimension 2 may be interpreted as a measure of the degree to which a given text exhibits features that are more characteristic of academic prose than of transcripts of conversations or fiction. The high positive loading listed for the Coxhead (2000) Academic Words feature, and the high negative loading listed for the Average Concreteness feature also support this interpretation. Based on this evidence, then, the second dimension in Table 5 was labeled the Academic Dimension.

Dimension #3: Narrative Style

Table 5 shows that all of the features with high loadings for this dimension also had high loadings on the second dimension reported in Biber (1988) or Reppen (2001), and/or on the third dimension reported in Biber (1986) or Biber et al. (2004). Since these dimensions were previously interpreted as measures of Narrative style, this suggests that the third dimension extracted in the current analysis is also a measure of narrative style. This interpretation is also supported by noting that three features with high positive loadings on this dimension (i.e., past tense verbs, past perfect aspect verbs and third person singular pronouns) and one feature with a high negative loading on this dimension (i.e., present tense verbs) have each been previously characterized as being indicative of a narrative style. This interpretation is also supported by a finding from Biber et al. (1999, p. 461) that fictional works, which are typically narratives, tend to have a high frequency of past perfect aspect verbs. Based on this evidence, then, the third dimension in Table 5 was labeled the Narrative Dimension.

Dimension #4: Syntactic Complexity

All three of our syntactic features loaded highly in this dimension. These included the average number of words per clause, the average number of words per sentence, and the average frequency of prepositions. Consequently, this dimension is labeled the Syntactic Complexity Dimension.

Dimension #5: Vocabulary Difficulty

The fifth dimension was determined to be a measure of the vocabulary level of a text based on the following results. First, the two features with high positive loadings for this dimension were each designed to detect texts with a high incidence of low frequency words as determined from the TASA Word Frequency Index (Zeno, et al., 1995). These included a normalized token count of words with TASA standardized frequency indices (SFIs) below 30, and a normalized type count of words with TASA SFIs below 30. Second, the one feature with a high negative loading for this dimension was the average per-passage TASA SFI. The negative loading for this feature means that passages with high average SFIs will tend to score lower on this dimension, while passages with low average SFIs will tend to score higher. Thus, the dimension yields lower scores for passages with low vocabulary demand, and higher scores for passages with high vocabulary demand. Consequently, this dimension is labeled the Vocabulary Difficulty Dimension.

Dimension #6: Overt Expression of Persuasion or Argumentation

Table 3 shows that several of the features that had high positive loadings on the 6$^{th}$ dimension had previously been identified as being characteristic of persuasive or argumentative text. For example, Biber (1988) identified a high frequency of infinitives as being a strong positive indicator of argumentation, and both Biber (1988) and Reppen (2001) identified modal verbs and conditional subordinators as being positively associated with level of argumentation. Based on this evidence, Dimension #6 was labeled "Overt Expression of Persuasion or Argumentation".

Dimension #7: Negation

The seventh dimension yielded high positive loadings for synthetic negations (e.g., no, neither, nor), adversative conjuncts and negative adverbs. Consequently, this dimension was labeled the Negation Dimension.

Dimension #8: Subordination

The eighth dimension yielded high positive loadings for several different types of subordinators, including concessive subordinators, causal subordinators and multi-function subordinators. Consequently, this dimension was labeled the Subordination Dimension.

Step 4: Modeling Variation in Text GL

The principal components analysis described above enabled us to define eight new measures of text variation. Each measure is defined as a linear combination of a subset of correlated text features. Table 6 shows how each of the resulting dimension scores correlates with text grade level. In order to account for possible genre effects, separate analyses are presented for informational and literary texts, and Z' scores calculated under the null hypothesis of no genre differences are also shown (see Cohen, et al., 2003, p. 49). The results suggest that four of the resulting dimension scores are significantly correlated with text grade level and four exhibit significant genre effects.

TABLE 6

Correlation Between Dimension Scores and Grade Level for Informational Texts (n = 243) and Literary Texts (n = 305)

| | | Correlation Coefficient | | |
|---|---|---|---|---|
| Dimension Scores | H$_1$ | Informational Texts | Literary Texts | Z' |
| Scores Expected to Increase with Text Difficulty | | | | |
| Syntactic Complexity | ρ > 0 | 0.406*** | 0.609*** | −3.212** |
| Vocabulary Difficulty | ρ > 0 | 0.609*** | 0.353*** | 3.938*** |
| Academic Score | ρ > 0 | 0.723*** | 0.559*** | 3.290** |
| Negation Score | ρ > 0 | 0.008 | 0.075 | −0.789 |
| Argument Score | ρ > 0 | −0.008 | 0.018 | −0.298 |
| Subordination | ρ > 0 | 0.085 | 0.025 | −0.789 |
| Scores Expected to Decrease with Text Difficulty | | | | |
| Spoken Language Score | ρ < 0 | −0.165** | −0.297*** | 1.633 |
| Narrative Score | ρ < 0 | 0.200 | 0.007 | 2.278* |

Note.
Correlation coefficients were tested via one-tailed tests defined with alternative hypotheses H$_1$.
Z' = Test statistic for testing equivalent correlation across genres, assuming a two-tailed alternative.
***p < .001,
**p < .01,
*p < .05

Figure 6A:
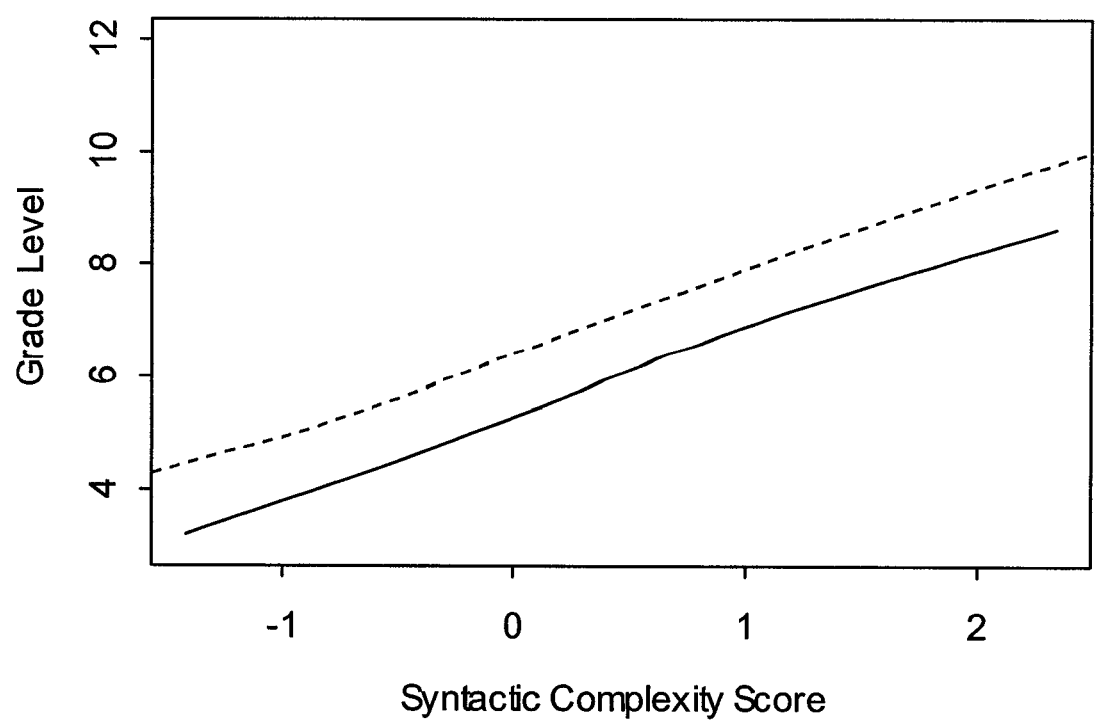
FIGS. 6A-6C are graphs that depict trends in text grade level variation plotted conditional on selected dimension scores, according to an embodiment. Trends for informational texts (n=243) are plotted with a solid line; trends for literary texts (n=305) are plotted with a dashed line.
Figure 6B:
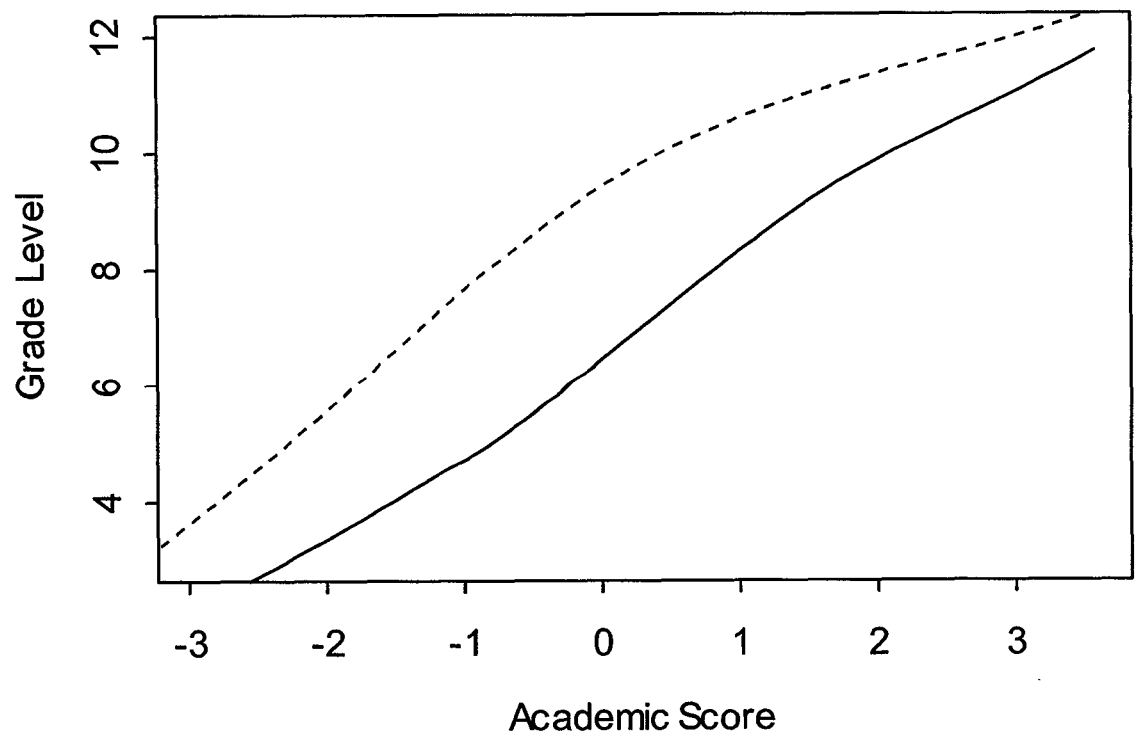
Figure 6C:
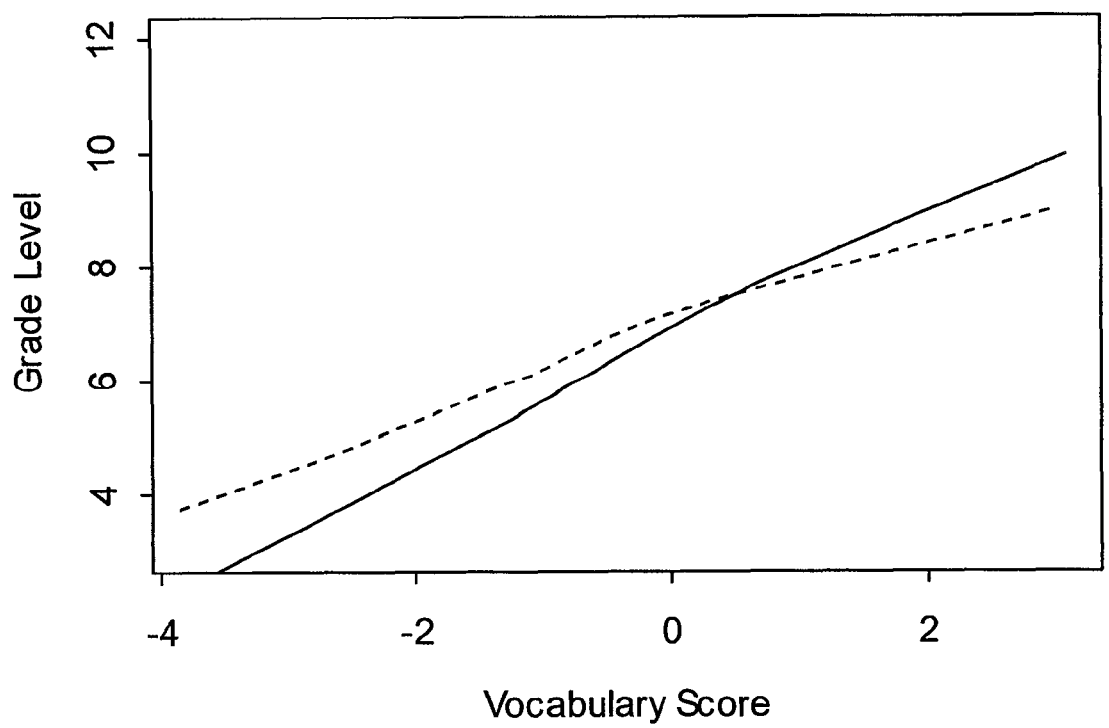

FIGS. 6A-6C present a series of smoothed curves designed to further illuminate these results. The Figures show how variation in three of the estimated dimension scores relates to variation in text GL. The three selected dimension scores are those that yielded the strongest correlations with text grade level. As in the previous plots, a LOWESS scatter plot smoother has been applied to the data (Cleveland, 1979). Results for informational texts are plotted with a solid line, while those for literary texts are plotted with a dashed line. Note that, as was suggested by the Z' statistics in Table 6, significant genre effects appear to be present in all three scores. The plots also suggest that the relationship between dimension score variation and GL variation is fairly linear. Consequently, linearity was assumed in each of the regression analyses reported below.

Generating Prediction Models for Informational and Literary Texts

Two independent regression analyses were implemented: one focused entirely on informational texts, and one focused entirely on literary texts. Training data for each analysis was developed by selecting an appropriate subset of texts from the ETS Passage Corpus. The informational subset included a total of 243 informational passages. The literary subset included a total of 305 literary passages. A total of 16 candidate predictors were considered in each analysis: eight dimension scores, six referential cohesion measures and two paragraph-level features. The best model (in both the informational and literary analyses) included four of the eight dimension scores, a measure of referential cohesion (calculated with stemming and with consideration of 3 previous sentences) and the normalized log length of the longest paragraph. Resulting regression coefficients are summarized in Table 7.

TABLE 7

Summary of Regression Results for Features Designed to Predict Variation in Text Grade Level, for Informational Texts (n = 243) and Literary Texts (n = 305)

| | Feature Coefficients | |
|---|---|---|
| Features | Informational Texts | Literary Texts |
| Intercept | −0.1585 | 1.8732 |
| Syntactic Complexity Score[a] | 0.4926** | 0.9101*** |
| Vocabulary Difficulty Score[a] | 0.4784*** | 0.3296*** |
| Academic Score[a] | 0.9744*** | 0.7002*** |
| Negation Score[a,] | 0.2378* | 0.2382** |
| Referential Cohesion Score[b] | −1.0943 | −2.9124*** |
| Length of Longest Paragraph | 3.5511*** | 3.3871*** |

Note.
[a]Estimated as a linear combination of 48 micro-level features.
[b]Estimated with Stemming = Yes and Look Back Window = 3.
*p < 0.05.
**p < 0.01.
***p < 0.001.

The resulting models are evaluated in Table 8. Three different evaluation criteria are shown: the correlation between human estimates of text GL and estimates obtained via the two SourceFinder models, estimates of the coefficient of determination (R-squared) and bias estimates calculated via Equation (2). Note that each of the two SourceFinder models yielded fairly high Adjusted R-squared values: the Adjusted R-squared for informational texts was 0.65, while that for literary texts was 0.61. Application of the Flesch-Kincaid GL Score to these same texts yielded somewhat lower R-squared values of 0.61 for informational texts and 0.40 for literary texts. These results confirm that although the SourceFinder approach yields improved validity for both informational and literary texts, the improvement is more pronounced for literary texts than for informational texts.

TABLE 8

Summary of Model Validity for two SourceFinder Models and the Flesch-Kincaid Grade Level Score

| Genre/Model | Correlation | Adjusted R-squared[a] | Bias |
|---|---|---|---|
| Informational Texts | | | |
| SourceFinder GL Score | 0.81*** | 0.65 | 0.00 |
| Flesch-Kincaid GL Score | 0.78*** | 0.61 | +1.28 |
| Literary Texts | | | |
| SourceFinder GL Score | 0.78*** | 0.61 | 0.00 |
| Flesch-Kincaid GL Score | 0.63*** | 0.40 | −1.05 |

Note.
GL = Grade Level.
[a]Only the SourceFinder estimate is adjusted. Since the Flesch-Kincaid Model was estimated on a different dataset, no adjustment is needed.
***p < .001.

Table 8 also summarizes the bias results obtained for each model. As expected, the two SourceFinder models yielded zero bias while the Flesch-Kincaid GL Score exhibited a positive bias for informational texts and a negative bias for literary texts. In particular, informational texts were overpredicted by an average of 1.28 GLs and literary texts were underpredicted by an average of 1.05 GLs.

The results in Table 8 confirm that, even though readability scores such as the Flesch-Kincaid GL score are frequently considered during the process of selecting passages for use on GL-specific high stakes accountability assessments, the final passage GL classifications developed for such assessments appear to incorporate an element of human judgment that is not entirely predictable from classical readability formulas. This suggests that professional assessment developers tend to discount feedback from classical readability formulas whenever it makes sense to do so, and that, as a result, training data developed from passages selected for use on high-stakes accountability assessments may provide information about text reading difficulty that exceeds that available from classical readability formulas. The results in Table 8 also suggest that SourceFinder has been successful at capturing some portion of that additional variation.

Step 5: Providing Feedback to Support Text Adaptation

The reading passages presented on high-stakes verbal reasoning assessments are frequently adapted to permit a closer alignment between passage characteristics and targeted state reading standards. Text adaptation is also a frequent activity of classroom teachers seeking to create adapted texts that are likely to be more accessible to struggling readers. SourceFinder's multi-level output is designed to facilitate this work. This output includes three types of feedback: (a) feedback about the overall expected difficulty level of a text; (b) feedback about text standing on each of the dimensions assumed to be contributing to the observed text difficulty variation; and (c) feedback about the individual text features considered during the dimension score calculation. This hierarchically-structured feedback is designed to help users quickly zero in on a subset of text features with good prospects for adjusting difficulty in the desired direction.

Figure 7:
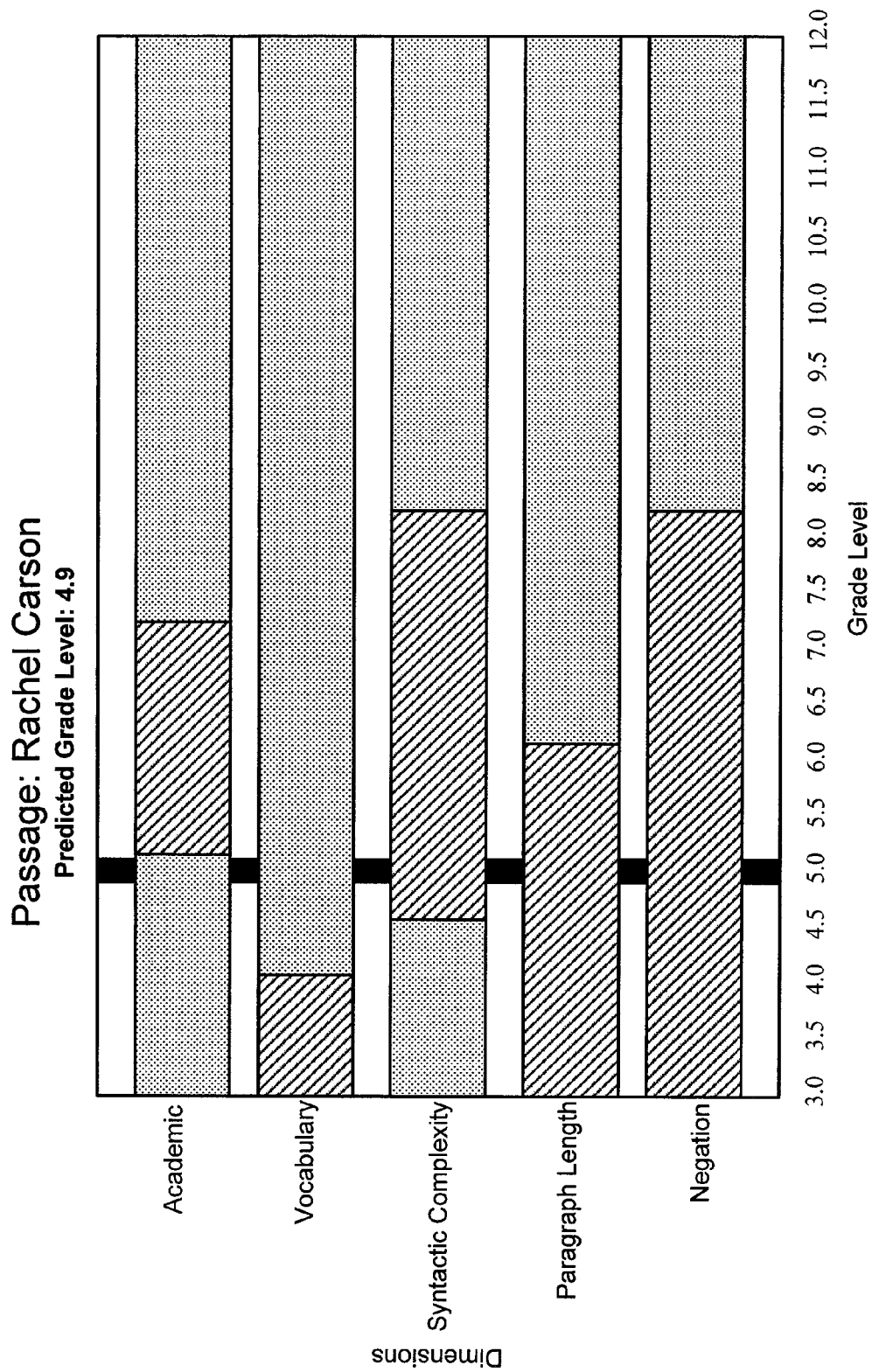
FIG. 7 is a horizontal barchart that illustrates how feedback about text difficulty could be presented to users, according to an embodiment.

A sample output display in shown in FIG. 7. [Note that this display is presented for illustrative purposes only. Any number of different display techniques could have been used to display the numerical outputs provided by this invention.] The sample display presents results for an informational passage about the distinguished environmentalist Rachel Carson. Two levels of feedback are shown. First, the overall predicted GL of the text is presented at the top of the display, and is also indicated by a dark vertical line. Second, a horizontal bar-chart, scaled by GL, is used to characterize passage standing relative to the individual feature scores considered in the GL calculation. The chart shows, for example, that although the text's Academic Score falls in the range from fifth to seventh grade, its Vocabulary Score is much lower, only spanning the range from third to fourth grade. A three-step procedure was implemented to develop the ranges shown in FIG. 7. First, the results in Table 7 were used to select a subset of relevant dimension scores for each targeted genre. For informational texts, for example, the selected dimensions were: syntactic complexity, vocabulary difficulty, academic style, negation, and length of longest paragraph. [Note: Referential cohesion was not selected because, as is shown in Table 7, it was not significant for informational texts.] Second, independent, single dimension difficulty prediction models were developed for each of the selected dimensions. For informational texts, for example, five independent prediction models were developed: one designed to capture variation due to syntactic complexity only; one designed to capture variation due to vocabulary difficulty only; one designed to capture variation due to academic style only; one designed to capture variation due to negation only; and one designed to capture variation due to the length of the longest paragraph only. Third, the resulting models were applied to the available passages and resulting estimates of text reading difficulty were summarized. Confidence intervals determined from the resulting predictions yielded the ranges shown in the figure. Note that, for each genre and dimension, the resulting ranges indicate the range of GLs expected for a text from the specified genre that exhibits a similar set of feature values for the specified dimension of variation.

A text adaptation strategy developed from this feedback might proceed as follows. First, the user would select a targeted GL. For purposes of illustration, let's assume that the user is looking for a text for use on a sixth grade assessment. Since the Predicted GL Score of 4.9 is lower than the targeted GL Score of 6, the user would then scan the display to locate one or more dimensions with good prospects for use in adjusting the prediction upward. A quick scan reveals that, while the Academic, Syntactic Complexity and Negation scores are all in the acceptable range for a sixth grade text, the Vocabulary score is clearly too low and the Paragraph Length feature is borderline too low. This suggests the following two-pronged adaptation strategy: First, look for opportunities to increase vocabulary demand by reviewing the list of Vocabulary features in Table 5. For example, it might be useful to replace one or more high frequency words with lower frequency words. Second, look for opportunities to increase paragraph length. The resulting adapted text would then be resubmitted to the system so that an updated version of the display in FIG. 7 could be created. The updated display would enable a determination of which, if any, additional adaptations were needed.

As is indicated in the above paragraph, proper use of the proposed invention requires an approach for determining whether the text under evaluation is an informational text or a literary text. Either human judgment or an automated genre classifier such as the one described in McCarthy, et al. (2006) could be used for this purpose.

Conclusion

Advances in natural language processing techniques permit instantaneous analyses of hundreds of text features. Resulting information about potential sources of comprehension difficulty is only useful to the extent that it is properly interpreted. The computer-implemented method, system, and computer program product described in this application includes five novel aspects designed to permit more valid interpretations of text characteristics, and of the relationships between those characteristics and text reading difficulty. These aspects can be summarized as follows:

(1) Because our literature review had indicated that the training methodologies employed in existing reading difficulty prediction systems incorporate a number of serious weaknesses, a new approach for developing needed training data was implemented. This new approach involves first downloading passages from a set of high-stakes accountability assessments and then employing an "inheritance" principle to assign a GL classification to each passage. This approach ensures that resulting text difficulty predictions are expressed on a U.S. GL scale that is reasonably well aligned with published state reading standards.

(2) Because our literature review had indicated that different processes are engaged when reading informational vs. literary texts, two independent prediction models are provided: one optimized for application to informational texts, and one optimized for application to literary texts.

(3) Because our feature set includes a large number of correlated text features, certain independent variables are defined via a principal components analysis implemented on a large corpus of texts selected to represent the range of linguistic variation typically encountered by students in their home and school-based reading. This ensures that the strong intercorrelations exhibited by many important linguistic features are appropriately accounted for.

(4) Multiple dimensions of text variation are addressed, including the classical readability dimensions of syntactic complexity and semantic difficulty, and innovative new dimensions such as the degree of academic orientation detected in a text, the degree of negation, and the degree of referential cohesion.

(5) Three types of feedback are provided: (a) feedback about the overall expected difficulty level of a text; (b) feedback about text standing on each of the dimensions of text variation found to be contributing to the observed difficulty variation; and (c) feedback about the individual text features considered in the dimension score calculation. This hierarchically-structured feedback is designed to help users quickly zero in on a subset of text features with good prospects for adjusting difficulty in the desired direction.

An evaluation of the resulting predictions confirms that SourceFinder's predictions of text difficulty are unbiased with respect to genre and are highly correlated with classifications provided by human experts.

The difficulty models described in this application are particularly suited for use in adapting texts to conform to specific targeted difficulty specifications because the models provide accurate information about the difficulty impacts resulting from different types of feature manipulations. Teachers, librarians and parents can also use the models to select texts appropriate for students reading at specified grade levels.

While the particular READING LEVEL ASSESSMENT METHOD, SYSTEM, AND COMPUTER PROGRAM PRODUCT FOR HIGH-STAKES TESTING APPLICATIONS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim.

All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

All publications mentioned herein are incorporated by reference in their entireties. Nothing herein is to be construed as an admission that the embodiments described herein are not entitled to antedate such disclosure by virtue of prior invention. As used herein, the term "comprising" means "including, but not limited to."

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed.

It is claimed:

1. A computer-implemented method of text passage difficulty estimation, comprising:
    generating, using a computer processing system, an informational text scoring model, wherein generating the informational text scoring model includes:
        identifying a plurality of texts from a corpus of texts that are informational texts;
        determining one or more metrics for the informational texts; and
        configuring the informational text scoring model using the one or more informational text metrics for application in scoring a difficulty of a text passage; and
    generating, using a computer processing system, a literary text scoring model, wherein generating the literary text scoring model includes:
        identifying a plurality of texts from the corpus of texts that are literary texts;
        determining one or more metrics for the literary texts, wherein the literary text metrics include one or more metrics that are either not included in the informational text metrics, or are included but are weighted differently; and
        configuring the literary text scoring model using the one or more literary text metrics for application in scoring the difficulty of the text passage,
    wherein the informational text scoring model and the literary text scoring model are configured to provide data about the difficulty of the text passage in a hierarchically structured format.

2. The method of claim 1, wherein, for an input text passage:
    an automatic determination is made as to whether the text passage is an informational passage or a literary passage;
    a difficulty estimate is computed for the text passage using the informational text scoring model when the text passage is an informational passage;
    the difficulty estimate is computed for the text passage using the literary text scoring model when the text passage is a literary passage; and
    the difficulty estimate is outputted.

3. The method of claim 2 wherein the difficulty estimate is adjusted based on whether the text passage is an informational passage or a literary passage.

4. The method of claim 2 wherein the difficulty estimate is in terms of grade level.

5. The method of claim 2 wherein the difficulty estimate is for grades 3 to 12.

6. The method of claim 2 wherein the difficulty estimate helps test developers locate text passages for tests.

7. The method of claim 2 wherein the difficulty estimate is highly correlated with difficulty classifications deemed to be true.

8. The method of claim 1, wherein the informational text scoring model and the literary text scoring model comprise metrics that include one or more of syntactic complexity, semantic difficulty, degree of academic style, and text cohesion.

9. The method of claim 8, wherein syntactic complexity is determined based upon average sentence length, average clause length, and average preposition frequency.

10. The method of claim 8, wherein semantic difficulty is determined based upon word length, word familiarity, word frequency, and rare word frequency.

11. The method of claim 8, wherein the degree of academic style is determined based upon normalizations, academic words, academic verbs, nouns of cognitive process or perception, passive constructions, and average concreteness rating.

12. The method of claim 8, wherein text cohesion is determined based upon factors from the group consisting of referential cohesion, causal cohesion, connective non-causal cohesion, and thematic continuity.

13. The method of claim 12, wherein causal cohesion and connective non-causal cohesion are measured using factors from the group consisting of causal coordinator term "because" frequency, concessive coordinator frequency, and clarification conjunct frequency.

14. The method of claim 12, wherein thematic continuity is measured by the ratio of definite determiners to indefinite determiners.

15. The method of claim 12, wherein text cohesion is measured by characterizing the prevalence of different types of sentence connectives from the group consisting of causal connectives, clarification conjuncts, conditional subordinators, concessive coordinators, and multi-function subordinators.

16. The method of claim 12, wherein referential cohesion measures are computed selectively
    (a) with lexical overlap calculated with and without stemming, and
    (b) considering noun overlap in up to three previous sentences.

17. The method of claim 1, wherein the corpus of texts includes a set of text passages classified as informational text and a further set of text passages classified as literary text.

18. The method of claim 1, wherein a text from the corpus of texts is identified as an informational text or a literary text based on characteristics of the text that include one or more of: spoken vs. written language, academic style, narrative style, syntactic complexity, vocabulary difficulty, overt expression of persuasion, negation, subordination.

19. The method of claim 1, wherein a text from the corpus of texts is identified as an informational text or a literary text based on characteristics of the text that include one or more of: usage rates of particular verbs, frequencies of first and second person pronouns, frequency of question marks, and ratio of nouns to verbs.

20. A computer processing system programmed to undertake method acts for text passage difficulty estimation, the method acts including:
    generating, using a computer processing system, an informational text scoring model, wherein generating the informational text scoring model includes:
        identifying a plurality of texts from a corpus of texts that are informational texts;

determining one or more metrics for the informational texts; and configuring the informational text scoring model using the one or more informational text metrics for application in scoring a difficulty of a text passage; and generating, using a computer processing system, a literary text scoring model, wherein generating the literary text scoring model includes:

identifying a plurality of texts from the corpus of texts that are literary texts;

determining one or more metrics for the literary texts, wherein the literary text metrics include one or more metrics that are not included in the informational text metrics; and configuring the literary text scoring model using the one or more literary text metrics for application in scoring the difficulty of the text passage, wherein the informational text scoring model and the literary text scoring model are configured to provide data about the difficulty of the text passage in a hierarchically structured format.

21. A non-transitory computer-readable storage medium comprising programming instructions for causing a computer processing system to perform a method text passage difficulty estimation, the method comprising:

generating, using a computer processing system, an informational text scoring model, wherein generating the informational text scoring model includes:

identifying a plurality of texts from a corpus of texts that are informational texts;

determining one or more metrics for the informational texts; and configuring the informational text scoring model using the one or more informational text metrics for application in scoring a difficulty of a text passage; and generating, using a computer processing system, a literary text scoring model, wherein generating the literary text scoring model includes:

identifying a plurality of texts from the corpus of texts that are literary texts;

determining one or more metrics for the literary texts, wherein the literary text metrics include one or more metrics that are not included in the informational text metrics; and configuring the literary text scoring model using the one or more literary text metrics for application in scoring the difficulty of the text passage, wherein the informational text scoring model and the literary text scoring model are configured to provide data about the difficulty of the text passage in a hierarchically structured format.

22. The system of claim 20, wherein the informational text scoring model and the literary text scoring model comprise metrics that include one or more of syntactic complexity, semantic difficulty, degree of academic style, and text cohesion.

23. The system of claim 20, wherein syntactic complexity is determined based upon average sentence length, average clause length, and average preposition frequency.

24. The system of claim 20, wherein semantic difficulty is determined based upon word length, word familiarity, word frequency, and rare word frequency.

25. The system of claim 20, wherein the degree of academic style is determined based upon normalizations, academic words, academic verbs, nouns of cognitive process or perception, passive constructions, and average concreteness rating.

26. The system of claim 20, wherein text cohesion is determined based upon factors from the group consisting of referential cohesion, causal cohesion, connective non-causal cohesion, and thematic continuity.

27. The non-transitory computer-readable storage medium of claim 21, wherein the informational text scoring model and the literary text scoring model comprise metrics that include one or more of syntactic complexity, semantic difficulty, degree of academic style, and text cohesion.

28. The non-transitory computer-readable storage medium of claim 21, wherein syntactic complexity is determined based upon average sentence length, average clause length, and average preposition frequency.

29. The non-transitory computer-readable storage medium of claim 21, wherein semantic difficulty is determined based upon word length, word familiarity, word frequency, and rare word frequency.

30. The non-transitory computer-readable storage medium of claim 21, wherein the degree of academic style is determined based upon normalizations, academic words, academic verbs, nouns of cognitive process or perception, passive constructions, and average concreteness rating.

31. The non-transitory computer-readable storage medium of claim 21, wherein text cohesion is determined based upon factors from the group consisting of referential cohesion, causal cohesion, connective non-causal cohesion, and thematic continuity.

* * * * *